(12) United States Patent
Hoshi

(10) Patent No.: US 10,215,126 B2
(45) Date of Patent: Feb. 26, 2019

(54) CONTROL DEVICE FOR INTERNAL COMBUSTION ENGINE

(71) Applicant: TOYOTA JIDOSHA KABUSHIKI KAISHA, Aichi-ken (JP)

(72) Inventor: Kenji Hoshi, Gotenba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 85 days.

(21) Appl. No.: 15/635,204

(22) Filed: Jun. 28, 2017

(65) Prior Publication Data

US 2018/0010548 A1  Jan. 11, 2018

(30) Foreign Application Priority Data

Jul. 5, 2016  (JP) .................. 2016-133422

(51) Int. Cl.
| | |
|---|---|
| *F01N 3/10* | (2006.01) |
| *F02B 23/10* | (2006.01) |
| *F02D 41/02* | (2006.01) |
| *F02D 41/40* | (2006.01) |
| *F02P 5/04* | (2006.01) |
| *F02D 41/38* | (2006.01) |

(52) U.S. Cl.
CPC ........... *F02D 41/402* (2013.01); *F01N 3/101* (2013.01); *F02B 23/101* (2013.01); *F02D 41/0245* (2013.01); *F02D 41/0255* (2013.01); *F02P 5/045* (2013.01); *F02B 2023/106* (2013.01); *F02D 2041/389* (2013.01)

(58) Field of Classification Search
CPC .. F01N 3/101; F02B 23/101; F02B 2023/106; F02D 41/0245; F02D 41/0255; F02D 41/402; F02D 2041/389; F02P 5/045
See application file for complete search history.

(56) References Cited

FOREIGN PATENT DOCUMENTS

| | | |
|---|---|---|
| JP | 5-272393 A | 10/1993 |
| JP | 11-280522 A | 10/1999 |
| JP | 2000-282920 A | 10/2000 |
| JP | 2003-148199 A | 5/2003 |
| JP | 2006-52687 A | 2/2006 |
| JP | 2008-190511 A | 8/2008 |
| JP | 2009-24627 A | 2/2009 |
| JP | 2009-185688 A | 8/2009 |

*Primary Examiner* — Brandon D Lee
(74) *Attorney, Agent, or Firm* — Hauptman Ham, LLP

(57) ABSTRACT

An intake stroke injection and a compression stroke injection are performed during catalyst warm-up control (upper section in FIG. 7). During the catalyst warm-up control, a discharge period at an electrode portion is set on a retard side of compression top dead center, and an expansion stroke injection is performed during the discharge period. However, when a distance between a spray contour surface and the electrode portion increases, an additional injection (first injection) is performed in advance of the expansion stroke injection (second injection) (lower section in FIG. 7). The additional injection is performed at a timing that is on the retard side of compression top dead center and is on an advance side relative to a start timing of the discharge at the electrode portion.

6 Claims, 27 Drawing Sheets

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2016-133422, filed on Jul. 5, 2016. The contents of these applications are incorporated herein by reference in their entirety.

TECHNICAL FIELD

The present disclosure relates to a control device for an internal combustion engine, and more particularly to a control device for controlling an internal combustion, engine that includes an injector and a spark plug in a combustion chamber, and also includes a catalyst (exhaust gas purification catalyst) that purifies exhaust gas from the combustion chamber.

BACKGROUND

Some control technologies to promote activation of an exhaust gas cleaning catalyst during an engine warming up process have been proposed for an engine comprising an injector and a spark plug provided in a combustion chamber. For example, JP 2006-052687 A discloses a control device for an internal combustion engine. The internal combustion engine comprises an injector, a spark plug and an exhaust gas cleaning catalyst. The injector is provided substantially at a center of an upper part of a combustion chamber and is configured to inject fuel into a cylinder directly. The;spark plug is provided at a portion in the upper part of the combustion chamber where a part of fuel spray from the injector reaches directly. The exhaust gas cleaning catalyst is provided in an exhaust passage. The control device is configured to perform an injection by the injector and an ignition by the spark plug in an expansion stroke to promote the activation of the exhaust gas cleaning catalyst.

The injection and the ignition in the expansion stroke are additionally performed after an injection and a subsequent ignition are performed in an intake stroke or a compression stroke. Specifically, a first time injection and a subsequent first time ignition are performed in the intake stroke or the compression stroke. Then, a second time injection and a subsequent second time ignition are performed in the middle to latter period of the expansion stroke to activate the exhaust gas cleaning catalyst. The second time fuel injection amount is set to be smaller than the first time fuel injection amount, and the second time ignition is performed before the fuel spray injected by the second time injection reaches a wall surface of the combustion chamber. Since a positional relationship between the injector and the spark plug is as described above and the second time ignition is performed at the timing described above, this control device allows almost all of fuel injected by the second time injection to be burned, thereby increasing the exhaust gas temperature.

The present inventors are considering a control for activating an exhaust gas cleaning catalyst in an engine configuration different from that disclosed in JP 2006-052687 A. The engine configuration under consideration is common to the engine configuration in the same publication in that both of an injector and a spark plug are provided in an upper part of a combustion chamber, and a part of fuel spray from the injector proceeds toward the spark plug. However, the engine configuration under consideration is different from the engine configuration in the same publication in that an electrode part of the spark plug is disposed in an area above a contour surface of a fuel spray pattern which is closest to the spark plug. Furthermore, the engine configuration under consideration is different from the engine configuration in the same publication in that a tumble flow is formed from intake air supplied into the combustion chamber, and the spark plug is disposed on a downstream side of the injector when viewing in a tumble flow direction.

The tumble flow formed in the combustion chamber swirls from the upper part of the combustion chamber downward at an exhaust port side and from a lower part of the combustion chamber upward at an intake port side. The control is being considered assuming such a tumble flow. Specifically, the control under consideration is performed so that first time injection is performed in an intake stroke to allow the fuel spray to swirl together with the tumble flow in the combustion chamber, and a timing of ignition by the spark plug is set to a timing retarded from a compression top dead center. In addition, in the control under consideration, a discharge period at the aforementioned electrode portion is set on a retard side of compression top dead center, and injection is also performed in this discharge period. The fuel injected from the injector in a high pressure state forms a low pressure area by entraining air around the fuel (entrainment). Therefore, when injection is performed during the discharge period, a discharge spark that arises at the electrode portion is attracted by the low pressure area that is formed around the fuel spray in the direction of the spark plug When a second ignition is performed after a second injection that is performed from a middle period to a latter period of an expansion stroke such as described in JP 2006-052687 A in a combustion chamber in which a tumble flow is occurring, during a period until the second ignition is started, the shape of a fuel spray produced by the second injection is liable to change due to the influence of the tumble flow or the in-cylinder pressure. Therefore, unless the positional design of the injector is performed taking into consideration the smoldering around the plug of the spark plug, or an optimal injection timing of the injector is selected, the concentration of an air-fuel mixture surrounding the spark plug will be unstable and combustion fluctuations will be large. In this respect, by utilizing the above described attraction action, a fuel spray that is produced by an injection during a discharge period caused by a discharge spark that is attracted by the aforementioned low pressure area can be combusted, and thus an initial flame which, at approximately the same timing as the fuel spray and discharge spark, arises from the discharge spark and the air-fuel mixture that includes a fuel spray produced by injection in the intake stroke that occur can be caused to grow to a certain extent. Therefore, combustion of a fuel spray produced by injection in the expansion stroke can be stabilized, and combustion fluctuations can be suppressed.

However, in the above described attraction action, a distance between a contour surface of the fuel spray in the direction of the spark plug that is produced by injection during the discharge period and the electrode portion is important. Therefore, when this distance increases, there is a possibility that the attraction action will be insufficient. Even when the attraction action is insufficient, it is possible to cause an initial flame to grow from an air-fuel mixture including a fuel spray produced by injection during the discharge period. However, the fact that the attraction action is insufficient means that the discharge spark is not sufficiently drawn to the fuel spray produced by an injection during the discharge period, and the concentration of the air-fuel mixture around the discharge spark is not high. Hence, when the attraction action is insufficient, growth of an initial flame is inhibited. Further, with respect to combustion cycles during the control under consideration, if there are many cycles in which such a situation occurs, combustion fluctuations between cycles will be large, and therefore drivability will be affected.

The present disclosure addresses the above described problem, and an object of the present disclosure is, in a case of performing activation control of an exhaust gas purification catalyst by means of an engine configuration in which some fuel spray from an injector travels in a direction of a spark plug that is disposed on a downstream side in a flow direction of a tumble flow, and an electrode portion of the spark plug is disposed in an area that is above a contour surface of the fuel spray that comes closest to the spark plug, to provide a countermeasure for a time when a distance between the contour surface and the electrode portion increases.

A control device for an internal combustion engine according to the present disclosure is a control device for controlling an internal combustion engine that includes: an injector which is provided in an upper portion of a combustion chamber and which directly injects fuel into a cylinder; a spark plug which ignites an air-fuel mixture inside a cylinder using a discharge spark that is generated at an electrode portion, and which is provided at a position that is at the upper portion of the combustion chamber and is on a downstream side relative to the injector in a flow direction of a tumble flow that is formed inside the combustion chamber, and is provided so that a position of the electrode portion is above a contour surface of a fuel spray that is injected toward the spark plug from the injector; and an exhaust gas purification catalyst that purifies exhaust gas from the combustion chamber. The control device is configured to control at least fuel injection by the injector and a discharge at the electrode portion by the spark plug. The control device is further configured to control the injector so as to perform an intake stroke injection and an expansion stroke injection that activate the exhaust gas purification catalyst and control the spark plug so as to generate a discharge spark at the electrode portion over a predetermined period that is a predetermined period on a retard side of compression top dead center and that includes a period in which the expansion stroke injection is performed. The control device is further configured to, when it is determined that a growth rate of an initial flame which arises from a discharge spark and which grows while engulfing a fuel spray produced by the expansion stroke injection in the predetermined period is less than a first determination value, control the injector so as to perform, in addition to the intake stroke injection and the expansion stroke injection, an additional injection at a timing that is on a retard side relative to compression top dead center and is on an advance side relative to an occurrence timing of the discharge spark at the electrode portion.

Since a fuel spray that is produced by the additional injection is carried in a downstream direction by the tumble flow, the fuel spray moves as far as the vicinity of the electrode portion at the time the expansion stroke injection is performed. Further, since a discharge spark occurs at the electrode portion at the time that the expansion stroke injection is performed, an initial flame that is produced based on an air-fuel mixture including a fuel spray produced by an injection and a discharge spark in the intake stroke grows at once as a result of engulfing the fuel spray produced by the additional injection. That is, by performing the additional injection, a time period until the initial flame engulfs the fuel spray produced by the expansion stroke injection is shortened.

The control device for an internal combustion engine according to the present disclosure may control the injector so that an injection amount of the additional injection is less than an injection amount of the expansion stroke injection.

Because the injection timing of the additional injection is on the retard side of compression top dead center, and is on an advance side relative to the predetermined period, if the injection amount of the additional injection is large, fuel is liable to adhere to a top face of a descending piston. In this respect, by making the injection amount of the additional injection less than the injection amount of the expansion stroke injection, occurrence of the aforementioned adherence of fuel is suppressed and an increase in a particulate number that is one object of emissions regulations is suppressed.

When it is determined that the growth rate is less than the first determination value, the control device for an internal combustion engine according to the present disclosure may control the injector so as to progressively increase an injection amount of the additional injection as a difference between the growth rate and the first determination value increases.

As described above, by performing the additional injection, a time period until the initial flame engulfs the fuel spray that is produced by the expansion stroke injection is shortened. However, when it is determined that the growth rate of the initial flame is significantly lower than the first determination value, even if an additional injection is performed thereafter, there is a possibility that a time period until the initial flame engulfs the fuel spray that is produced by the expansion stroke injection will not be shortened sufficiently. In this respect, by progressively increasing the injection amount of the additional injection as a difference between the growth rate of the initial flame and the first determination value increases, it is possible to sufficiently shorten the time period until the initial flame engulfs the fuel spray that is produced by the expansion stroke injection.

When it is determined that the growth rate is still lower than the first determination value even though the injector is controlled so as to perform the additional injection, the control device for an internal combustion engine according to the present disclosure may control the injector so as to increase an injection amount of the expansion stroke injection, or control the injector so as to advance an injection timing of the expansion stroke injection and control the spark plug so as to advance the occurrence timing.

If the injection amount of the expansion stroke injection is increased, a fuel spray produced by the expansion stroke injection will disperse over a wider area, and hence a time period until the initial flame that grows by engulfing the fuel spray produced by the additional injection engulfs the fuel spray produced by the expansion stroke injection will be shortened.

If the injection timing of the expansion stroke injection and the start timing of the predetermined period are advanced, the in-cylinder pressure rises. When the in-cylinder pressure is high, it becomes difficult for the fuel spray produced by the expansion stroke injection to disperse in the travelling direction, and therefore the fuel spray becomes thick. If the fuel spray produced by the expansion stroke injection becomes thick, a distance between a contour surface of the fuel spray that proceeds in the direction of the spark plug and the electrode portion is shortened, and therefore the time period until the initial flame that grows by engulfing the fuel spray produced by the additional injection engulfs the fuel spray produced by the expansion stroke injection will be shortened.

When it is determined that, as a result of controlling the injector so as to perform the additional injection, the growth rate exceeds a second determination value that is greater than the first determination value, the control device for an internal combustion engine according to the present disclosure may control the injector so as to decrease an injection amount of the expansion stroke injection, or control the injector so as to retard an injection timing of the expansion stroke injection, or control the spark plug so as to advance a start timing of the predetermined period, or control the injector so as to retard an injection timing of the expansion stroke injection and control the spark plug so as to retard the occurrence timing.

If the injection amount of the expansion stroke injection is decreased, a fuel spray produced by the expansion stroke injection will disperse in a narrower range, and therefore a time period until an initial flame that grows by engulfing a fuel spray produced by the additional injection further engulfs a fuel spray produced by the gbexpansion stroke injection will lengthen.

If the injection timing of the expansion stroke injection is retarded, a time period until an initial flame that grows by engulfing a fuel spray produced by the additional injection further engulfs a fuel spray produced by the expansion stroke injection will lengthen.

If the occurrence timing of a discharge spark at the electrode portion is advanced, although an initial flame that arises from the discharge spark will engulf a fuel spray produced by the additional injection and grow in an early stage, a time period until the initial flame further engulfs a fuel spray produced by the expansion stroke injection will lengthen.

If the injection timing of the expansion stroke injection and the occurrence timing of a discharge spark at the electrode portion are retarded, the in-cylinder pressure will decrease. If the in-cylinder pressure decreases, it becomes easy for a fuel spray that is produced by the expansion stroke injection to disperse in the travelling direction, and therefore the fuel spray becomes narrower. If the fuel spray produced by the expansion stroke injection becomes narrower, a distance between the electrode portion and the contour surface of the fuel spray travelling in the direction of the spark plug will increase, and therefore a time period until an initial flame that grows by engulfing a fuel spray produced by the additional injection further engulfs a fuel spray produced by the expansion stroke injection will lengthen.

The control device for an internal combustion engine according to the present disclosure may perform a determination with respect to the growth rate based on a crank angle period until a mass fraction burned becomes 10% from 0% after occurrence of a discharge spark at the electrode portion.

It is possible to make a determination regarding the growth rate of an initial flame if the determination is based on a crank angle period until a mass fraction burned becomes 10% from 0% after the occurrence of a discharge spark at the electrode portion.

According to the control device for an internal combustion engine of the present disclosure, when a distance between an electrode portion and a contour surface of a fuel spray which travels in the direction of a spark plug and which is produced by an injection during a discharge period increases, it is possible for a time period until an initial flame that grows by engulfing a fuel spray produced by an additional injection further engulfs a fuel spray produced by an expansion stroke injection to be confined within an optimal range. Hence, combustion fluctuations between cycles can be made small and the influence of such combustion fluctuations on drivability can be favorably suppressed.

DESCRIPTION OF EMBODIMENTS

Figure 1:
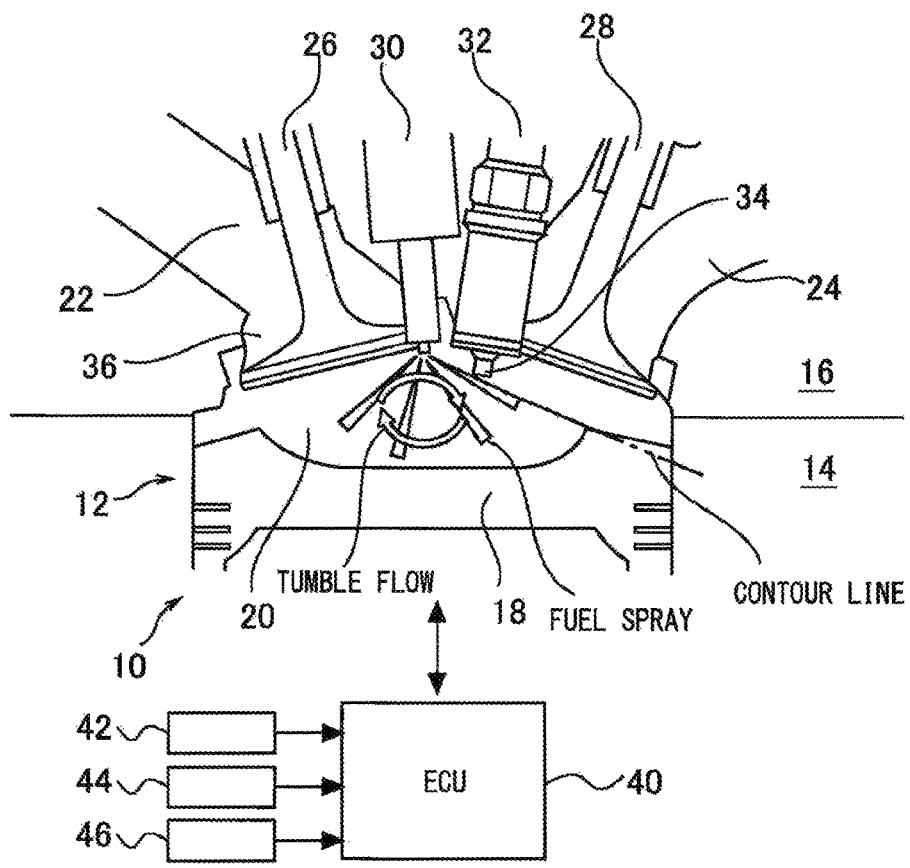
FIG. 1 is a view for describing a system configuration according to a first embodiment of the present disclosure.

Hereunder, embodiments of the present disclosure will be described based on the accompanying drawings. Note that elements that are common to the respective drawings are denoted by the same reference characters and a duplicate description thereof is omitted. Further, the present disclosure is not limited to the embodiments described hereunder.

First Embodiment

First, a first embodiment of the present disclosure will be described referring to FIG. 1 to FIG. 15.
[Description of System Configuration]

FIG. 1 is a view for describing the system configuration of the first embodiment of the present disclosure. As illustrated in FIG. 1, a system according to the present embodiment includes an internal combustion engine 10 that is mounted in a vehicle. The internal combustion engine 10 is a four-stroke, one-cycle engine that has a plurality of cylinders. However, only one cylinder 12 among the plurality of cylinders is depicted in FIG. 1. The internal combustion engine 10 has a cylinder block 14 in which the cylinder 12 is formed, and a cylinder head 16 that is disposed above the cylinder block 14. In the cylinder 12, a piston 18 is arranged that reciprocates in the axial direction thereof (the vertical direction in the present embodiment). A combustion chamber 20 of the internal combustion engine 10 is defined by at least a wall surface of the cylinder block 14, a bottom face of the cylinder head 16 and a top face of the piston 18.

Two intake ports 22 and two exhaust ports 24 which communicate with the combustion chamber 20 are formed in the cylinder head 16. An intake valve 26 is provided at an opening portion that communicates with the combustion chamber 20 of each intake port 22. An exhaust valve 28 is provided at an opening portion that communicates with the combustion chamber 20 of each exhaust port 24. Further, an injector 30 is provided in the cylinder head 16 so that a tip thereof faces the combustion chamber 20 from approximately the center of an upper portion of the combustion chamber 20. The injector 30 is connected to a fuel supply system that is constituted by a fuel tank, a common rail, a supply pump and the like. A plurality of injection holes are formed in a radial shape in the tip of the injector 30. When the injector 30 is opened, fuel is injected in a high pressure state from the injection holes.

In the cylinder head 16, a spark plug 32 is provided at an upper portion of the combustion chamber 20 at a position that is further to the side of the exhaust valve 28 in comparison to the location at which the injector 30 is provided. The spark plug 32 includes, at the tip thereof, an electrode portion 34 that is constituted by a center electrode and a ground electrode. The electrode portion 34 is arranged so as to project into an area that is above a contour surface of a fuel spray (hereunder, also referred to as "spray contour surface" of the injector 30 (that is, into an area from the spray contour surface to the bottom face of the cylinder head 16). More specifically, the electrode portion 34 is arranged so as to project into an area that is above a contour surface of a fuel spray that comes closest to the spark plug 32 among fuel sprays ejected in a radial shape from the injection holes of the injector 30. Note that, a contour line drawn in FIG. 1 represents a contour surface of the fuel spray that comes closest to the spark plug 32 among the fuel sprays from the injector 30.

The intake port 22 extends approximately straight in the direction of the combustion chamber 20 from an inlet on the intake passage side, and the channel cross-sectional area is narrowed down at a throat 36 that is a connecting portion with the combustion chamber 20. This shape of the intake port 22 generates a tumble flow in intake air that is supplied from the intake port 22 to the combustion chamber 20. The tumble flow swirls inside the combustion chamber 20. More specifically, at the upper portion of the combustion chamber 20 the tumble flow moves from the intake port 22 side toward the exhaust port 24 side, and on the exhaust port 24 side the tumble flow moves from the upper portion of the combustion chamber 20 toward the lower portion thereof. Further, at the lower portion of the combustion chamber 20 the tumble flow moves from the exhaust port 24 side to the intake port 22 side, and on the intake port 22 side the tumble flow moves from the lower portion of the combustion chamber 20 toward the upper portion thereof. A depression for holding the tumble flow is formed in the upper face of the piston 18 that forms the bottom portion of the combustion chamber 20.

Further, as illustrated in FIG. 1, the system according to the present embodiment includes an ECU (electronic control unit) 40 as control means. The ECU 40 includes a RAM (random access memory), a ROM (read only memory), a CPU (central processing unit) and the like. The ECU 40 performs processing to take in signals of various sensors that are mounted in the vehicle. The various sensors include at least an in-cylinder pressure sensor 42 that is provided at the upper portion of the combustion chamber 20, a crank angle sensor 44 that detects a rotation angle of a crankshaft that is connected to the piston 18, and a temperature sensor 46 that detects a temperature of cooling water of the internal combustion engine 10. The ECU 40 processes the signals of the respective sensors that are taken in, and actuates various actuators in accordance with a predetermined control program. The actuators that are actuated by the ECU 40 include at least the injector 30 and the spark plug 32 that are described above.

[Startup Control by ECU 40]

In the present embodiment, control that promotes activation of an exhaust gas purification catalyst (hereunder, also referred to as "catalyst warm-up control") is performed as control immediately after a cold startup of the internal combustion engine 10 by the ECU 40 that is illustrated in FIG. 1. The exhaust gas purification catalyst is a catalyst that is provided in an intake passage of the internal combustion engine 10. A three-way catalyst that purifies nitrogen oxides (NOx), hydrocarbon (HC) and carbon monoxide (CO) contained in exhaust gas when the atmosphere of the catalyst that is in an activated state is in the vicinity of stoichiometry may be mentioned as one example of the exhaust gas purification catalyst.

Figure 2:
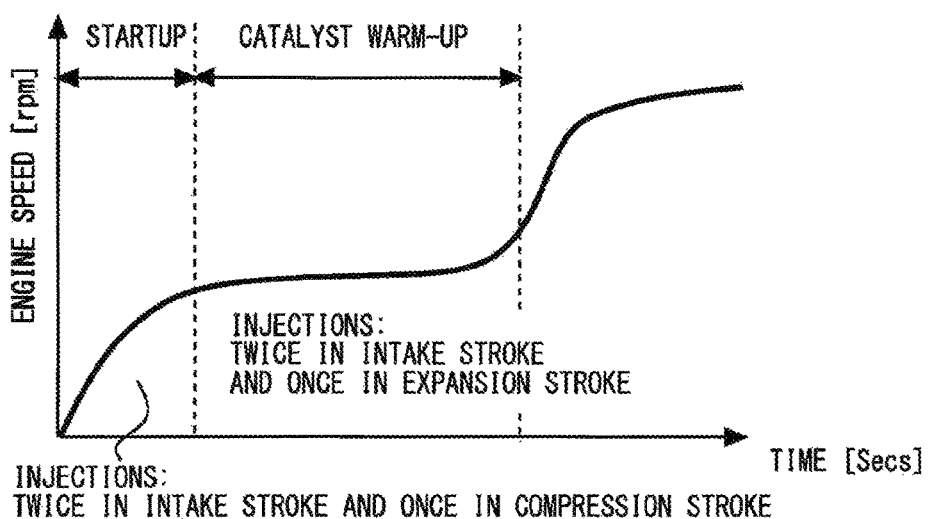
FIG. 2 is a view that illustrates an example of a fuel injection pattern immediately after startup of an internal combustion engine 10.

The catalyst warm-up control will now be described referring to FIG. 2 to FIG. 4. FIG. 2 illustrates an example of a fuel injection pattern immediately after a cold startup of the internal combustion engine 10. As illustrated in FIG. 2, immediately after startup, first, a fuel injection pattern is adopted in which a single injection in an intake stroke (hereunder, also referred to as "intake stroke injection") and a single injection in a compression stroke (hereunder, also referred to as "compression stroke injection") are combined. Thereafter, accompanying an increase in the engine speed, the compression stroke injection is switched to a single injection in an expansion stroke (hereunder, also referred to as "expansion stroke injection") so as to start the catalyst warm-up control. That is, in the catalyst warm-up control, a fuel injection pattern that combines the intake stroke injection and the expansion stroke injection is adopted.

Figure 3:
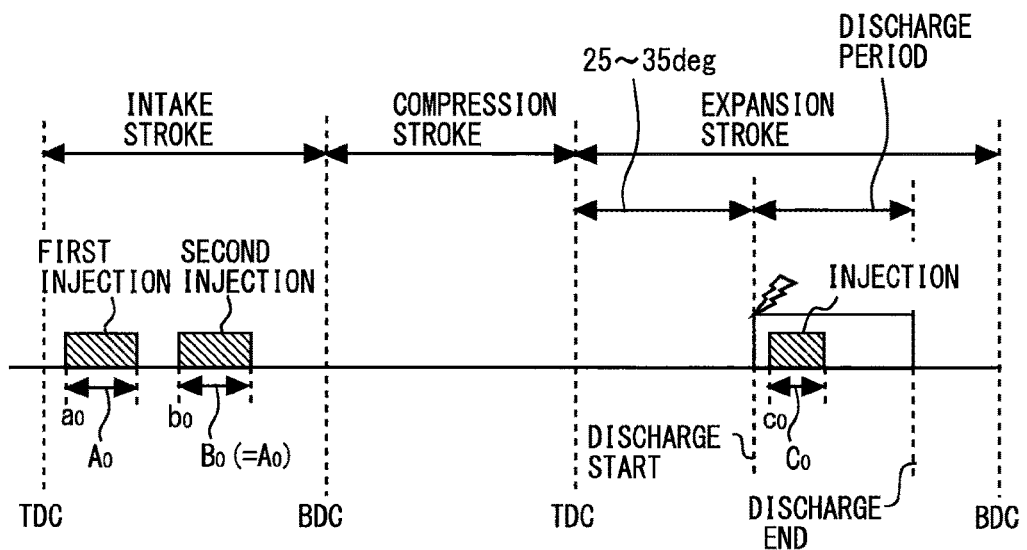
FIG. 3 is a view that illustrates injection start timings, injection periods and a discharge period at an electrode portion 34 during catalyst warm-up control.
Figure 4:
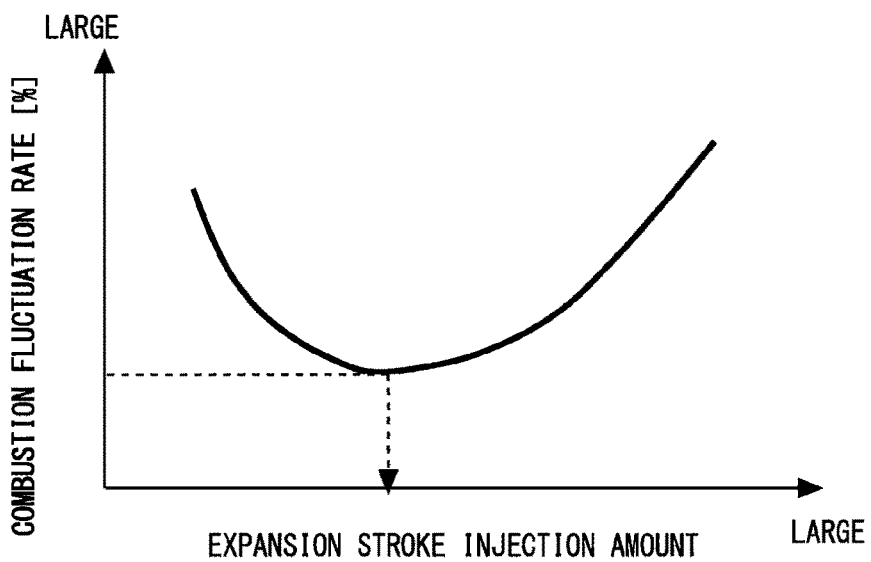
FIG. 4 is a view that illustrates a relation between a combustion fluctuation rate and a fuel injection amount for an expansion stroke injection.

Injection start timings, injection periods, and a discharge period at the electrode portion 34 during catalyst warm-up control are illustrated in FIG. 3. As illustrated in FIG. 3, a first intake stroke injection is started at a crank angle $a_0$ (as one example, in the vicinity of BTDC 300°), and a second intake stroke injection is started at a crank angle $b_0$ (as one example, in the vicinity of BTDC 260°). The second intake stroke injection is performed for the purpose of increasing the homogeneity of the air-fuel mixture in the combustion chamber 20. However, once fuel is injected at the crank angle $b_0$, the amount of fuel that adheres to the wall surface of the combustion chamber 20 increases, and a particulate number PN that is one object of emissions regulations increases. To avoid the occurrence of this situation, a part of the fuel for injection in the second intake stroke injection is allocated to the first intake stroke injection. In this connection, in the present embodiment, since half of the second injection amount for the intake stroke injections is allocated to the first injection amount, a first injection period $A_0$ and a second injection period $B_0$ shown in FIG. 3 are equal. Note that, the second injection amount and the first injection amount for the intake stroke injections may be changed, and the total number of injections in the intake stroke may also be set to three or more.

As illustrated in FIG. 3, during catalyst warm-up control, a discharge period (predetermined period) at the electrode portion 34 is set on the retard side of compression top dead center. The reason for setting the discharge period on the retard side of compression top dead center is to raise the exhaust gas temperature, and expansion stroke injection is performed during this discharge period. More specifically, the expansion stroke injection is started at a crank angle $c_0$ that is on the retard side relative to the start timing (as one example, the vicinity of ATDC 25 to 35°) of the discharge at the electrode portion 34, and an injection period $C_0$ ends on the advance side relative to the end timing of the discharge at the electrode portion 34. However, the start timing of the discharge at the electrode portion 34 and the crank angle $c_0$ may match, and the end timing of the discharge at the electrode portion 34 and the completion timing of the injection period $C_0$ may match. The reason that the expansion stroke injection is performed during the discharge period is to reliably combust fuel injected by the expansion stroke injection by means of an attraction action. The details of the attraction action are described later.

The injection period $C_0$ shown in FIG. 3 is set based on a relation between a combustion fluctuation rate that is obtained under equivalent operating conditions as the operating conditions during catalyst warm-up control and the fuel injection amount for the expansion stroke injection. An example of this relation is illustrated in FIG. 4. As illustrated in FIG. 4, a combustion fluctuation rate obtained under equivalent operating conditions as the operating conditions during catalyst warm-up control has a downwardly convex shape within a specific fuel injection amount range. The injection period $C_0$ is set as an injection period corresponding to a fuel injection amount when the combustion fluctuation rate becomes smallest (as one example, around 5 mm³/st).

[Catalyst Warm-Up Control Utilizing Attraction Action and Issue Relating Thereto]

Figure 5:
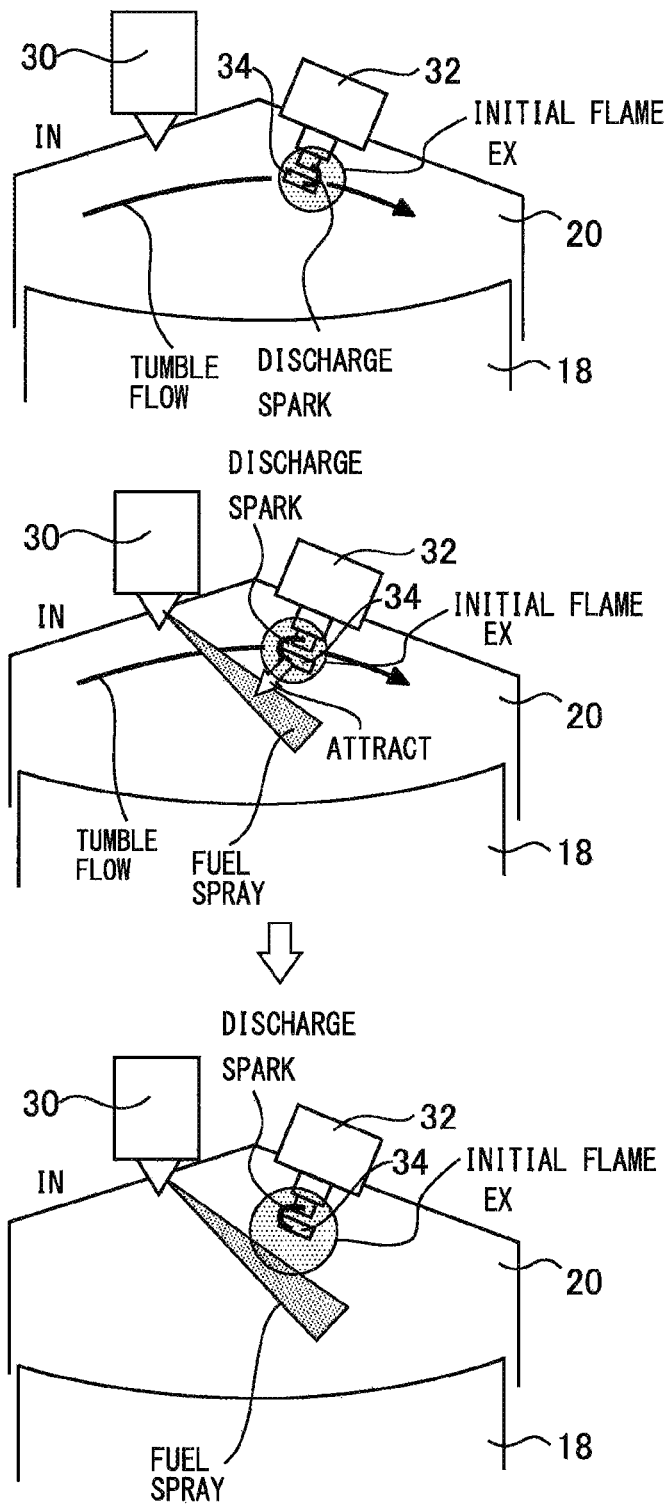
FIG. 5 is a view for describing an attraction action with respect to a discharge spark that is caused by an expansion stroke injection.

FIG. 5 is a view for describing an attraction action with respect to a discharge spark that is caused by an expansion stroke injection. Two discharge spark states during the discharge period at the electrode portion 34 are illustrated in the upper diagram and the middle diagram in FIG. 5. The upper diagram in FIG. 5 corresponds to a case where an expansion stroke injection is not performed, and the middle diagram and lower diagram in FIG. 5 correspond to a case where an expansion stroke injection is performed. Note that, for convenience of description, among the fuel sprays produced by the expansion stroke injection, only a fuel spray that is closest to the spark plug 32 is illustrated in FIG. 5. When an expansion stroke injection is not performed, a discharge spark that arises at the electrode portion 34 extends in the flow direction of the tumble flow (upper diagram in FIG. 5). On the other hand, when an expansion stroke injection is performed, since a low pressure area is formed around the fuel spray (entrainment), a discharge spark that arises at the electrode portion 34 is attracted in the opposite direction to the flow direction of the tumble flow (middle diagram in FIG. 5). Consequently, an initial flame that arises from the discharge spark and an air-fuel mixture including the fuel spray produced by the intake stroke injection engulfs the fuel spray produced by the expansion stroke injection and grows at once (lower diagram in FIG. 5).

The fuel spray produced by the expansion stroke injection is influenced by the tumble flow and the in-cylinder pressure. Therefore, when the expansion stroke injection is performed in a period that is before the discharge period, the shape of a fuel spray produced by the expansion stroke injection changes before the fuel spray eventually arrives at the electrode portion 34, and combustion fluctuations are liable to become large. In this respect, according to the catalyst warm-up control that utilizes the attraction action illustrated in the middle diagram in FIG. 5, since combustion that causes the initial flame to grow (hereunder, also referred to as "initial combustion") can be stabilized even if the shape of the fuel spray produced by the expansion stroke injection changes, combustion fluctuations can be suppressed. In addition, combustion that follows the initial combustion, that is, combustion in which the grown initial flame further engulfs an air-fuel mixture that includes a fuel spray produced by the intake stroke injection (hereunder, also referred to as "main combustion") can also be stabilized.

Figure 6:
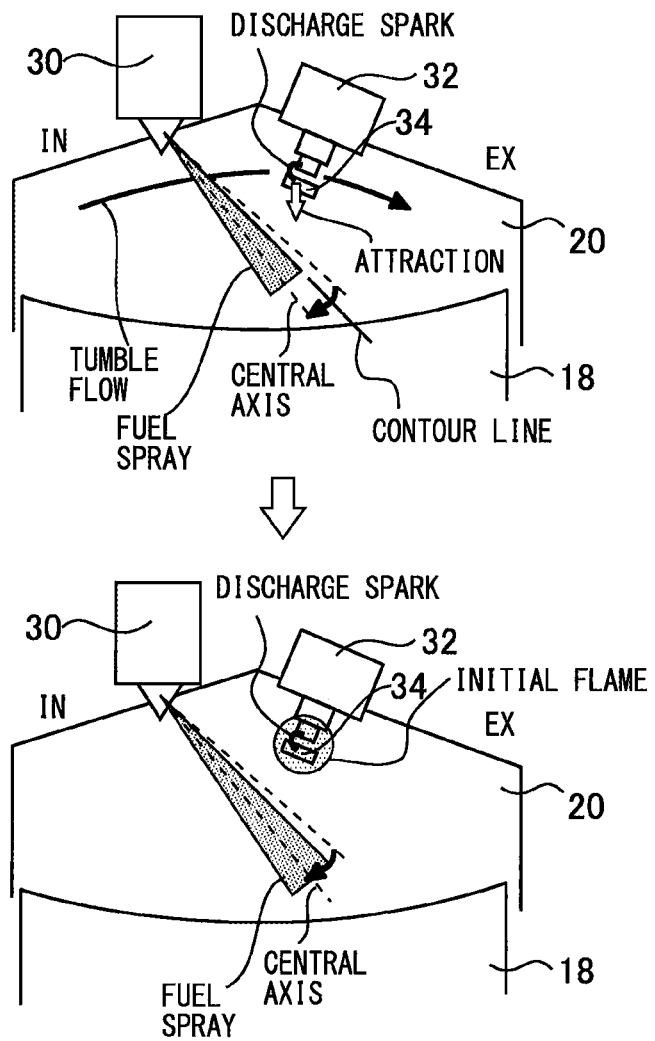
FIG. 6 is a view for describing an issue relating to catalyst warm-up control.

However, a distance between the spray contour surface and the electrode portion 34 (hereunder, also referred to as "distance DT") is important in the attraction action. Therefore, when the distance DT increases due to a reason such as aged deterioration, there is a possibility that the attraction action will be insufficient. FIG. 6 is a view for describing an issue relating to the catalyst warm-up control. As illustrated in the upper diagram in FIG. 6, when a central axis of a fuel spray produced by the expansion stroke injection moves in the direction of the lower portion of the combustion chamber 20 (that is, the direction of the top face of the piston 18), the distance between the spray contour surface and the electrode portion 34 increases, and the attraction action is insufficient. In such a case, as illustrated in the lower diagram in FIG. 6, growth of the initial flame that engulfs the fuel spray produced by the expansion stroke injection is suppressed, and the growth rate of the initial flame, that is, the rate of initial combustion decreases. Further, if there are a large number of cycles in which this situation occurs among the combustion cycles during the catalyst warm-up control, there will be large combustion fluctuations between cycles and this will affect the drivability.

[Characteristics of Catalyst Warm-Up Control in First Embodiment]

Therefore, in the present embodiment a determination is made with respect to the distance DT during the catalyst warm-up control. If it is determined that there is an increase in the distance DT, two injections are performed in the intake stroke and two injections are performed in the expansion stroke. The two injections in the intake stroke are basically the same as the intake stroke injection described above. The two injections in the expansion stroke are constituted by the expansion stroke injection described above and an additional injection that is performed ahead of the expansion stroke injection. The additional injection is performed at a timing that is on the retard side of compression top dead center and is on the advance side relative to the start timing of the discharge at the electrode portion 34. Note that, for convenience of description, in the following description the additional injection is also referred to as "expansion stroke first injection" and the expansion stroke injection is also referred to as "expansion stroke second injection".

Figure 7:
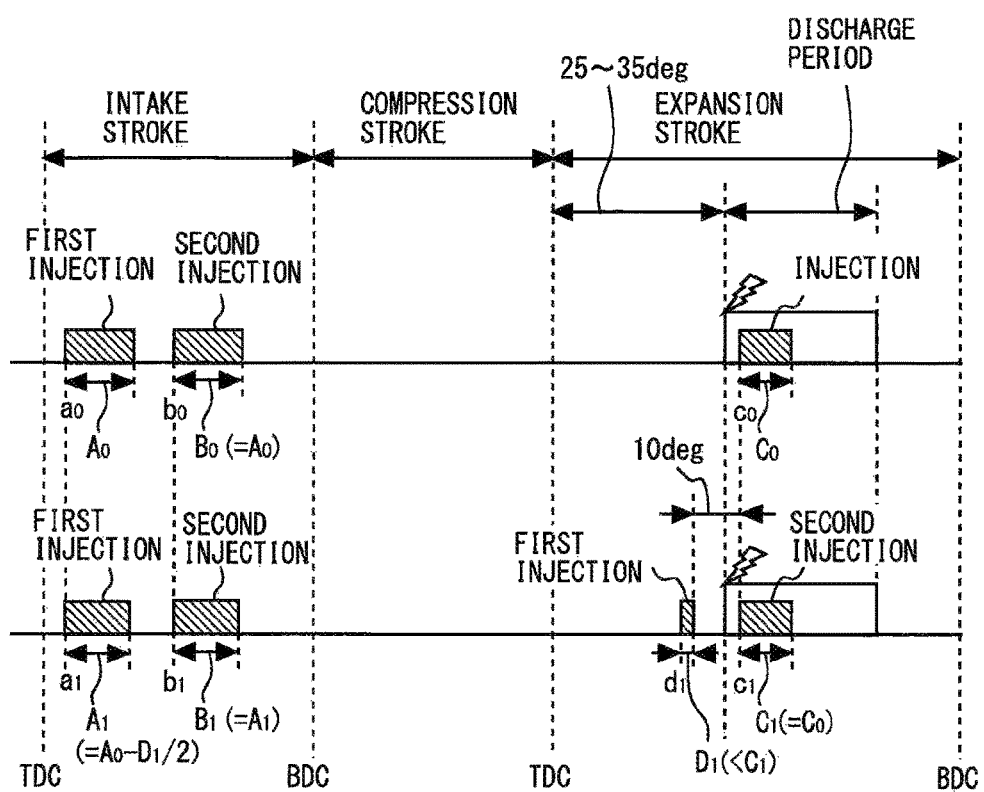
FIG. 7 is a view that illustrates an overview of catalyst warm-up control in the first embodiment of the present disclosure.

FIG. 7 is a view for describing an overview of the catalyst warm-up control of the first embodiment of the present disclosure. Similarly to FIG. 3, in FIG. 7, injection start timings, injection periods, and discharge periods at the electrode portion 34 during the catalyst warm-up control are illustrated. The upper section in FIG. 7 corresponds to control in a case in which the distance DT does not increase, or a case where although the distance DT increases, a determination regarding the increase is not made. In such cases, control that is the same as the control described in FIG. 3 (fuel injection control and discharge control) is performed.

The lower section in FIG. 7 corresponds to control when it is determined that there is an increase in the distance DT. In this case, the discharge control (start timing and period of the discharge) is maintained as it is, and the fuel injection control (start timing and period of the fuel injection) is partially changed. That is, the expansion stroke first injection is started at a crank angle $d_1$ and is performed over an injection period $D_1$. Further, the expansion stroke second injection is started at a crank angle $c_1$ and is performed over an injection period $C_1$. Here, the crank angle $c_1$ matches the crank angle $c_0$, and the injection period $C_1$ is set to a period that is equal to the injection period $C_0$. Further, an interval between the completion timing of the injection period $D_1$ and the crank angle $c_1$ corresponds to a period (as one example, 10°) that is required in order to charge the injector 30. The details of the injection period $D_1$ are described later.

Further, in the lower section in FIG. 7, a first intake stroke injection is started at a crank angle $a_1$, and a second intake stroke injection is started at a crank angle $b_1$. Here, the crank angles $a_1$ and $b_1$ match the crank angles $a_0$ and $b_0$. Further, a first injection period $A_1$ and a second injection period $B_1$ of the intake stroke injections are set to equal periods. However, the injection periods $A_1$ and $B_1$ are set to a shorter period than the injection period $A_0$ (=$B_0$). The reason is to make the total injection amounts in a single combustion cycle equal in the upper section and lower section in FIG. 7. Therefore, the injection periods $A_1$ and $B_1$ are shorter than the injection period $A_0$ (or injection period $B_0$) by an amount that is equivalent to half of the injection period $D_1$ ($A_1$=$B_1$=$A_0$−$D_1$/2). Note that the total injection amount in a single combustion cycle is calculated separately in the ECU 40 so that the in-cylinder air-fuel ratio becomes equal to the stoichiometric air-fuel ratio.

Figure 8:
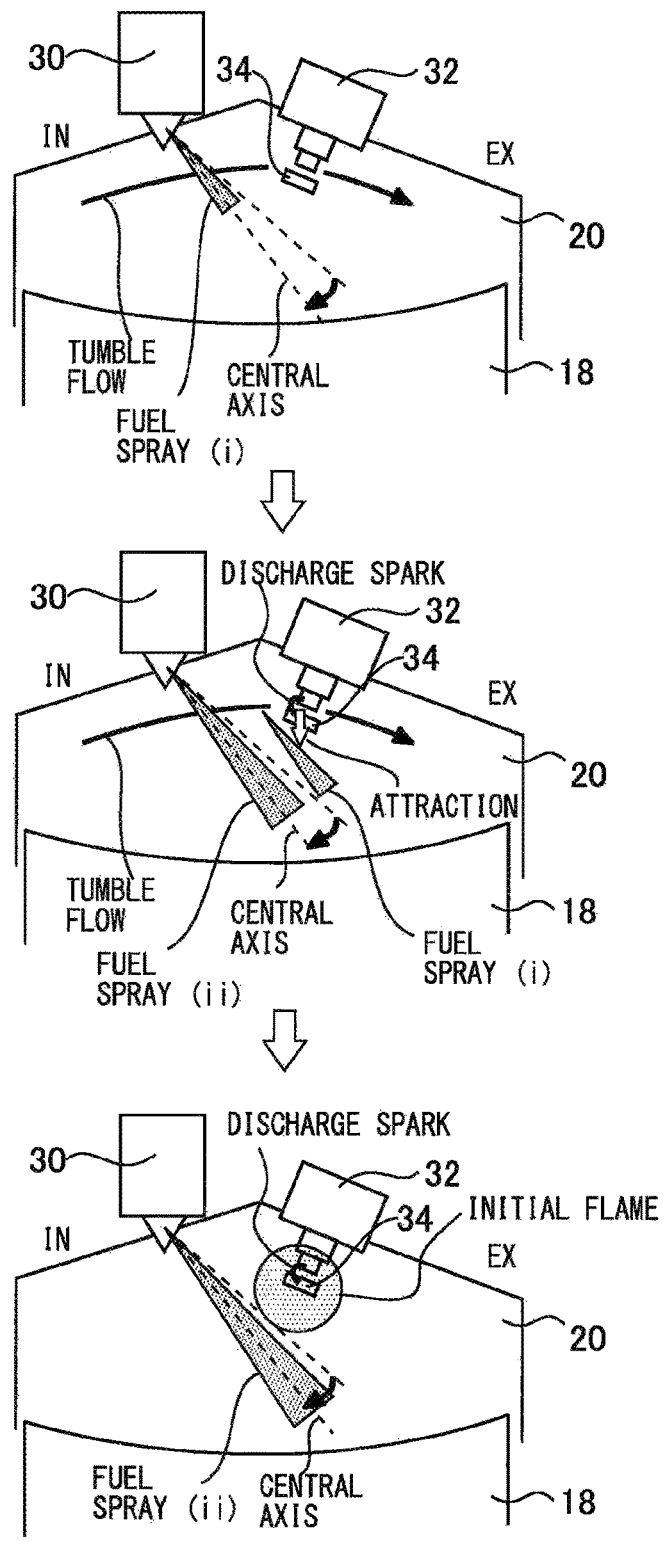
FIG. 8 is a view for describing in-cylinder states when two injections are performed in an expansion stroke.

FIG. 8 is a view for describing in-cylinder states in a case of performing two injections in the expansion stroke. A "fuel spray (i)" depicted in the upper diagram and middle diagram in FIG. 8 corresponds to a fuel spray that is closest to the spark plug 32 among fuel sprays produced by the expansion stroke first injection. A "fuel spray (ii)" depicted in the middle diagram and lower diagram in FIG. 8 corresponds to a fuel spray that is closest to the spark plug 32 among fuel sprays produced by the expansion stroke second injection. Since a tumble flow is formed in the combustion chamber 20, the fuel spray (i) is carried to the downstream side in the flow direction of the tumble flow (upper diagram and middle diagram in FIG. 8). Therefore, the fuel spray (i) moves as far as the vicinity of the electrode portion 34 (middle diagram in FIG. 8) at the time the expansion stroke second injection is performed. Further, a discharge spark occurs at the electrode portion 34 at the time of the expansion stroke second injection, and an initial flame that arises from the discharge spark and an air-fuel mixture including a fuel spray produced by the intake stroke injection engulfs the fuel spray (i) and grows at once (lower diagram in FIG. 8). Thus, if the expansion stroke first injection is performed, a time period until the initial flame engulfs the fuel spray (ii) is shortened. That is, a decrease in the rate of initial combustion is suppressed.

[Details of Expansion Stroke First Injection]

Figure 9:
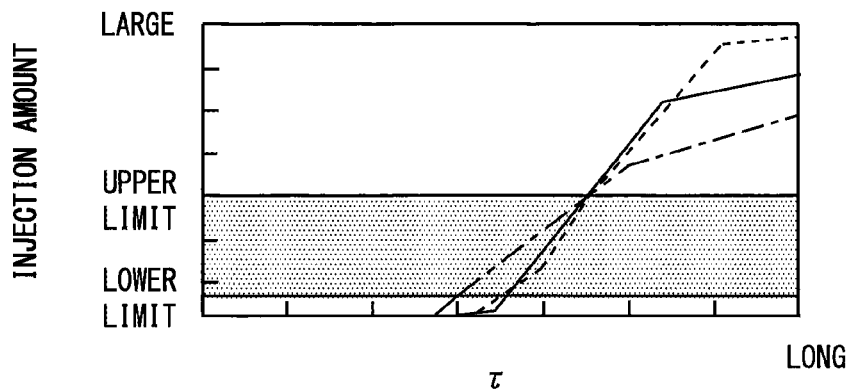
FIG. 9 is a view illustrating an example of the relation between a valve opening period ti and an injected fuel amount of an injector.

The details of the crank angle $d_1$ and the injection period $D_1$ illustrated in FIG. 7 will now be described referring to FIG. 9 to FIG. 12. FIG. 9 is a view that illustrates one example of the relation between a valve opening period $\tau$ and an injected fuel amount of an injector. In order to realize the movement of the fuel spray (i) that is described above referring to FIG. 8, in the present embodiment the injection period $D_1$ is set to a shorter period than the injection period $C_1$. However, as illustrated in FIG. 9, in a region in which the valve opening period $\tau$ is extremely short, the valve opening period $\tau$ and the injected fuel amount do not exhibit a linear relationship. This nonlinearity is caused by the structure of the injector. Therefore, when setting the injection period $D_1$, a fuel injection amount in a partial lift stability region (as one example, 1 to 5 mm³/st (30 MPa)) that is framed by an upper limit and lower limit as shown in FIG. 9 is adopted.

Figure 10:
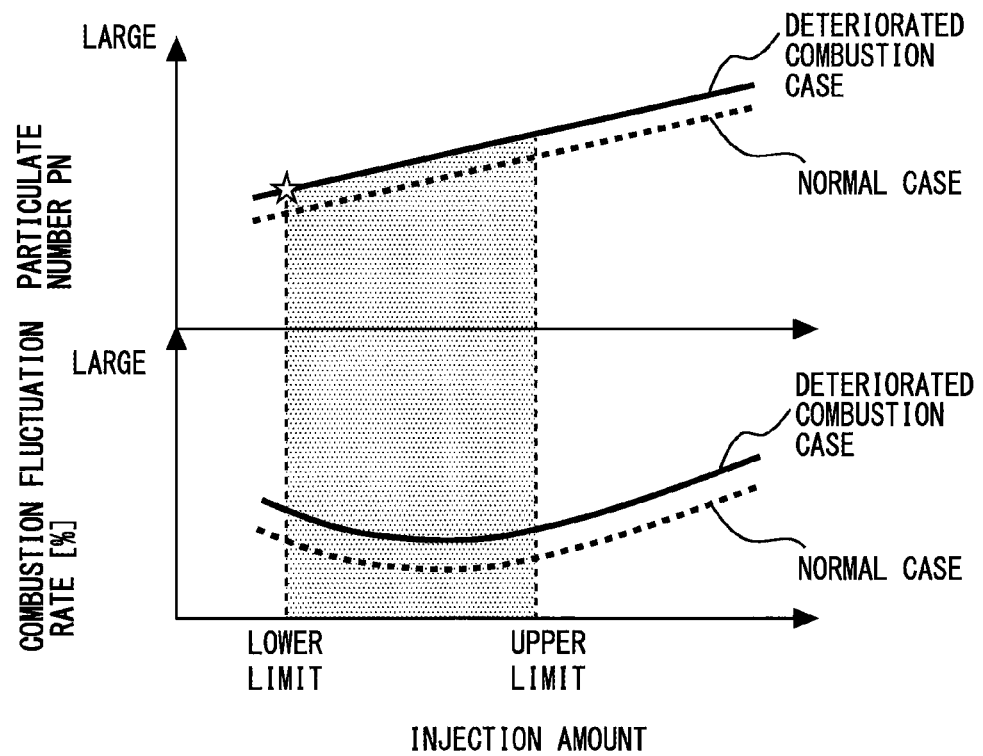
FIG. 10 is a view illustrating an example of the relation between a particulate number PN and a combustion fluctuation rate, and a fuel injection amount.

FIG. 10 is a view that illustrates one example of the relation between the fuel injection amount and the particulate number PN and combustion fluctuation rate. The horizontal axis in FIG. 10 corresponds to the vertical axis in FIG. 9. As illustrated in the upper section in FIG. 10, the particulate number PN increases as the fuel injection amount becomes larger. Further, comparing a case where the combustion state is normal (normal time) and a case where the combustion state deteriorated (a time of deteriorated combustion), it is found that the particulate number PN becomes higher when the combustion state deteriorates in comparison to when the combustion state is normal. On the other hand, as illustrated in the lower section in FIG. 10, the combustion fluctuation rate exhibits a downwardly convex shape in a range that is framed by the upper limit and lower limit. Further, comparing a case where the combustion state is normal (normal time) and a case where the combustion state deteriorated (a time of deteriorated combustion), it is found that the combustion fluctuation rate becomes higher when the combustion state deteriorates in comparison to when the combustion state is normal. In the present embodiment, the particulate number PN is taken as having a higher priority than the combustion fluctuation rate, and therefore a fuel injection amount that corresponds to the lower limit of the partial lift stability region is adopted (see upper section in FIG. 10). Note that, a configuration may also be adopted that gives priority to the combustion fluctuation rate and not the particulate number PN, or that gives priority to a balance between the particulate number PN and the combustion fluctuation rate.

Figure 11:
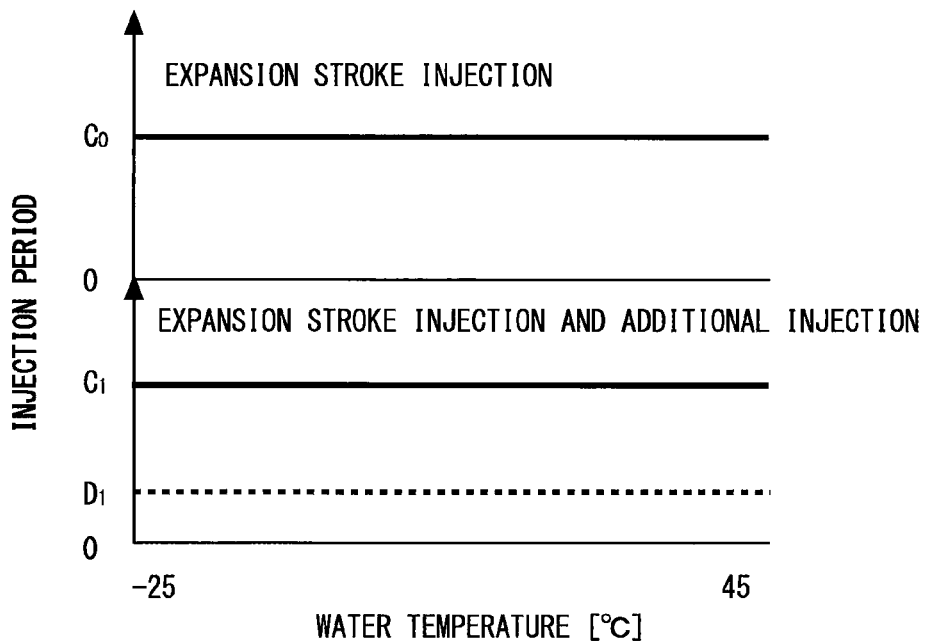
FIG. 11 is a view illustrating an example of the relation between an engine cooling water temperature during a cold startup of the internal combustion engine 10 and an injection period $D_1$.

FIG. 11 is a view that illustrates an example of the relation between the engine cooling water temperature during a cold startup of the internal combustion engine 10 and the injection period $D_1$. As illustrated in the lower section in FIG. 11, the injection period $D_1$ is set to a constant period irrespective of the engine cooling water temperature during a cold startup. Note that, as illustrated in the upper section and lower section in FIG. 11, the injection periods $C_0$ and $C_1$ are also set to constant periods irrespective of the engine cooling water temperature during a cold startup.

Figure 12:
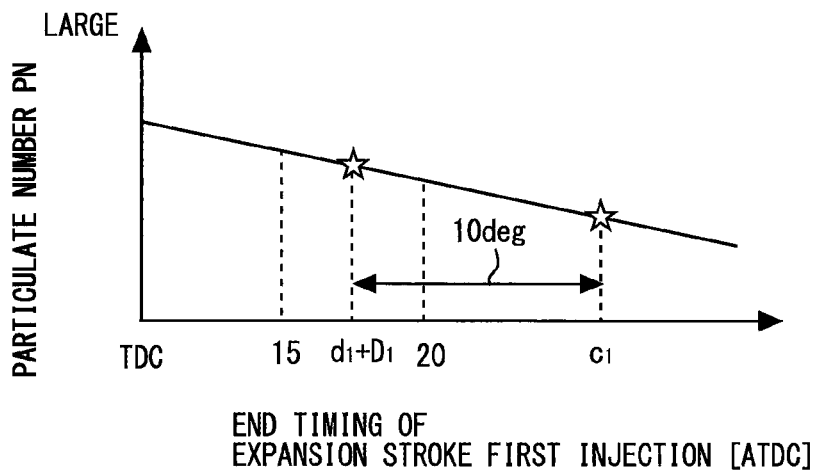
FIG. 12 is a view illustrating an example of the relation between a completion timing of the injection period $D_1$ and the particulate number PN.

FIG. 12 is a view that illustrates an example of the relation between the completion timing ($=d_1+D_1$) of the injection period $D_1$ and the particulate number PN (where the injection period $D_1$ is constant). As illustrated in FIG. 12, from compression top dead center onwards, the more that the completion timing is retarded, the more the particulate number PN decreases. The reason is that, in the expansion stroke, the further that the piston 18 descends, the greater the decrease in the amount of fuel adhering to the top face of the piston 18. However, in order to realize the movement of the fuel spray (i) that is described above using FIG. 8, it is necessary to set the completion timing further on the advance side relative to the discharge period at the electrode portion 34. Furthermore, taking into consideration the charging time period of the injector 30 that is described above, the completion timing also cannot be set too close to the crank angle $c_1$. The completion timing is determined based on at least these considerations (as one example, the completion timing is between ATDC 15° and 20°). The crank angle $d_1$ is then set by calculating backwards from the determined completion timing by an amount corresponding to the injection period $D_1$.

[Determination Relating to Distance DT]

A determination regarding whether or not to perform the expansion stroke first injection is made based on a determination relating to the distance DT. In the present embodiment this determination is made utilizing a crank angle period CA0-CA10 (hereunder, also referred to as "SA-CA10") in which mass fraction burned (MFB) reaches 10% from the ignition timing (that is, the discharge start timing of the electrode portion 34). Note that, MFB is calculated based on a result of analyzing in-cylinder pressure data that is obtained utilizing the in-cylinder pressure sensor 42 and the crank angle sensor 44, and SA-CA10 is calculated based on the calculated MFB. A method for calculating MFB based on an analysis result with respect to in-cylinder pressure data and a method for calculating SA-CA10 are described in detail in, for example, JP 2015-094339 A and JP 2015-098799 A, and hence a description thereof is omitted from the present description.

Figure 13:
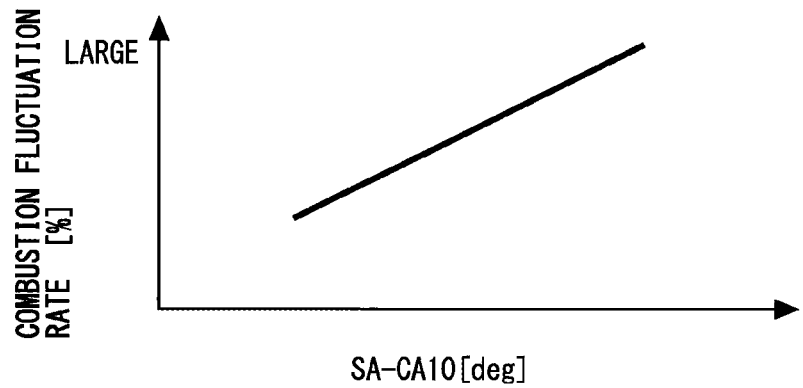
FIG. 13 is a view illustrating the relation between a combustion fluctuation rate and SA-CA10.

FIG. 13 is a view that illustrates the relation between the combustion fluctuation rate and SA-CA10. As illustrated in FIG. 13, the combustion fluctuation rate increases as SA-CA10 lengthens. In this case, one reason for the combustion fluctuation rate increasing is that, as already described in the foregoing, the distance DT increases and the rate of initial combustion decreases (see the description of the lower diagram in FIG. 6). Therefore, on this basis, when the calculated SA-CA10 is longer than the SA-CA10 before the distance DT increases, that is, the SA-CA10 at a normal time, it can be surmised that one reason for this is a decrease in the rate of initial combustion accompanying an increase in the distance DT.

Figure 14:
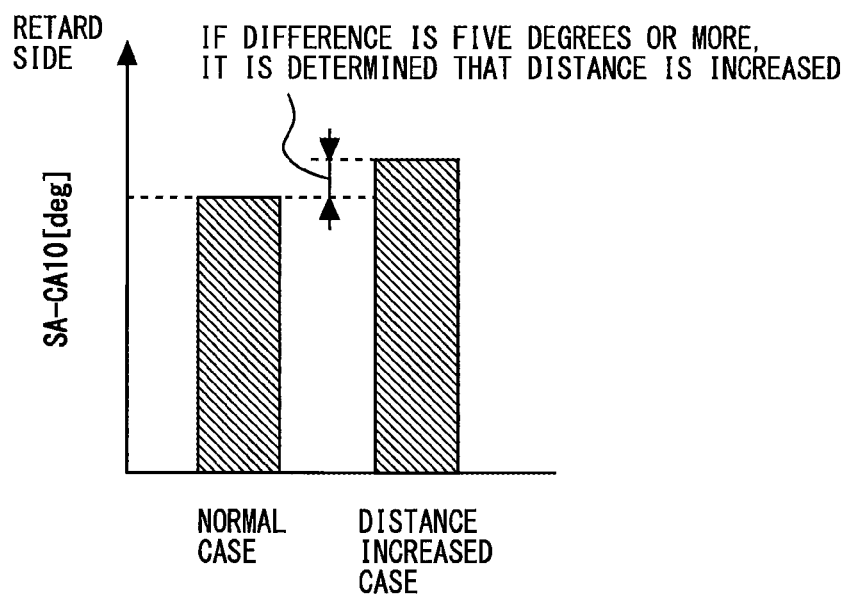
FIG. 14 is a view for describing a determination value that relates to a distance DT.

FIG. 14 is a view for describing a determination value relating to the distance DT. As illustrated in FIG. 14, in the present embodiment, when the SA-CA10 that is actually calculated (hereunder, also referred to as "actual SA-CA10") is longer than the SA-CA10 at a normal time by a predetermined crank angle period (as one example, 5°) or more, it is determined that there is an increase in the distance DT. Note that, the SA-CA10 that is longer than the SA-CA10 at a normal time by an amount corresponding to a predetermined crank angle period is set after determining the "SA-CA10 at a normal time" in advance by adaptation.

Specific Processing in First Embodiment

Figure 15:
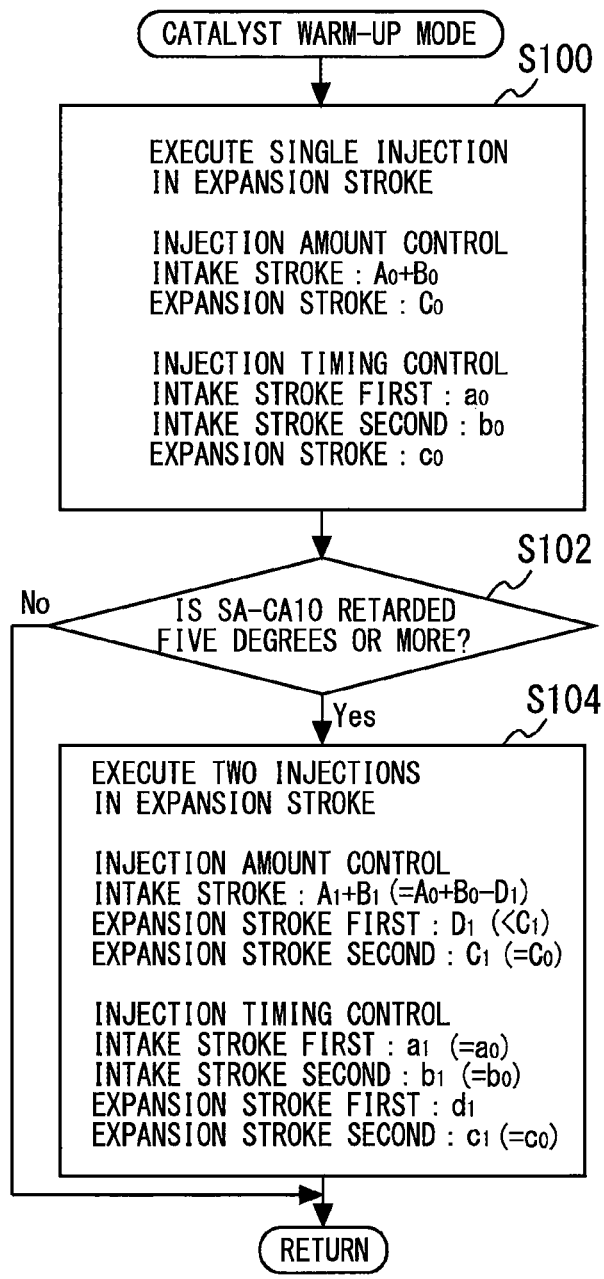
FIG. 15 is a flowchart illustrating an example of processing that an ECU 40 executes in the first embodiment of the present disclosure.

FIG. 15 is a flowchart illustrating one example of processing that the ECU 40 executes in the first embodiment of the present disclosure. Note that the routine shown in FIG. 15 is repeatedly executed during a period in which an operation mode that executes the catalyst warm-up control (hereunder, also referred to as "catalyst warm-up mode") is selected.

In the routine illustrated in FIG. 15, first, fuel injection control for performing a single injection in the expansion stroke is executed (step S100). In the present step S100, specifically, injection amounts (injection periods $A_0$ and $B_0$) and injection timings (crank angles $a_0$ and $b_0$) for intake stroke injections are set. Further, an injection amount (injection period $C_0$) and an injection timing (crank angle $c_0$) for an expansion stroke injection are set.

Following step S100, the ECU 40 determines whether or not the actual SA-CA10 is longer than the SA-CA10 at a normal time by a predetermined crank angle period or more (step S102). In the present step S102, the actual SA-CA10 that is calculated separately in the ECU 40 is acquired, and is compared with the SA-CA10 at a normal time (setting value). If it is determined as a result of the comparison that the actual SA-CA10 is longer than the SA-CA10 at a normal time by the predetermined crank angle period or more (when the result is "Yes"), the processing proceeds to step S104. In contrast, if it is determined otherwise (when the result is "No"), the ECU 40 exits the present routine.

In step S104, fuel injection control for performing two injections in the expansion stroke is executed. In the present step S104, specifically, injection amounts (injection periods $A_1$ and $B_1$) and injection timings (crank angles $a_1$ and $b_1$) for intake stroke injections are set. Further, an injection amount (injection period $D_1$) and an injection timing (crank angle $d_1$) for an expansion stroke first injection are set. In addition, an injection amount (injection period $C_1$) and an injection timing (crank angle $c_1$) for an expansion stroke second injection are set.

According to the first embodiment that is described above, the following advantageous effects can be obtained. That is, when the distance DT is not increasing, initial combustion is stabilized by the expansion stroke injection described using FIG. 3, and thus the main combustion can be stabilized and combustion fluctuations can be suppressed. Further, even when there is an increase in the distance DT, initial combustion can be stabilized by the expansion stroke first injection described in the lower section in FIG. 7, and combustion fluctuations can be suppressed. The main combustion can also be stabilized.

Modification of First Embodiment

In the above first embodiment, a configuration is adopted in which a tumble flow that is formed in the combustion chamber 20 swirls on the exhaust port 24 side so as to travel from the upper portion of the combustion chamber 20 toward the lower portion thereof, and swirls on the intake port 22 side so as to travel from the lower portion of the combustion chamber 20 toward the upper portion thereof. However, a configuration may be adopted in which the tumble flow swirls in the opposite direction, that is, from the upper portion toward the lower portion of the combustion chamber 20 on the intake port 22 side, and from the lower portion toward the upper portion of the combustion chamber 20 on the exhaust port 24 side. However, in this case, it is necessary to change the location at which the spark plug 32 is arranged from the exhaust valve 28 side to the intake valve 26 side. If the location at which the spark plug 32 is arranged is changed in this manner, the spark plug 32 will be positioned on the downstream side of the injector 30 in the flow direction of the tumble flow. Therefore, movement of the fuel spray (that is, the fuel spray (i)) that is produced by the expansion stroke first injection that is described above using FIG. 8 in the direction of the electrode portion 34 can be realized. Note that the present modification can be similarly applied to the second to eighth embodiments that are described later.

Further, in the above first embodiment, a determination regarding an increase in the distance DT is made utilizing SA-CA10. However, instead of SA-CA10, a determination regarding an increase in the distance DT may be made using a known parameter having a correlation with the rate of initial combustion. That is, as long as the parameter is a known parameter with respect to a determination value (first determination value) of which the rate of initial combustion can be compared, the parameter can be used instead of SA-CA10. Note that the present modification can be similarly applied to the second to eighth embodiments that are described later.

Second Embodiment

Next, a second embodiment of the present disclosure will be described referring to FIG. 16 to FIG. 18.

Note that the present embodiment is based on the premise of adopting the system configuration illustrated in FIG. 1, and hence a description of the system configuration is omitted here.

Characteristics of Catalyst Warm-Up Control in Second Embodiment

In the above first embodiment, when the actual SA-CA10 is longer than the SA-CA10 at a normal time by a predetermined crank angle period or more, it is determined that there is an increase in the distance DT, and expansion stroke first injection is performed. However, because a fuel injection amount in the partial lift stability region (see FIG. 10) is adopted as the fuel injection amount of the expansion stroke first injection, the following problem exists. That is, when the SA-CA10 is longer than the SA-CA10 at a normal time by a predetermined crank angle period or more, and the crank angle periods of both the actual SA-CA10 and the SA-CA10 at a normal time are large, there is a possibility that, irrespective of a fact that the expansion stroke first injection is performed, a time period until the initial flame engulfs a fuel spray produced by the expansion stroke second injection will not be sufficiently shortened. Therefore, in the present embodiment, if it is determined that the distance DT is increasing, the injection amount for the expansion stroke first injection is increased in accordance with the aforementioned crank angle period.

Figure 16:
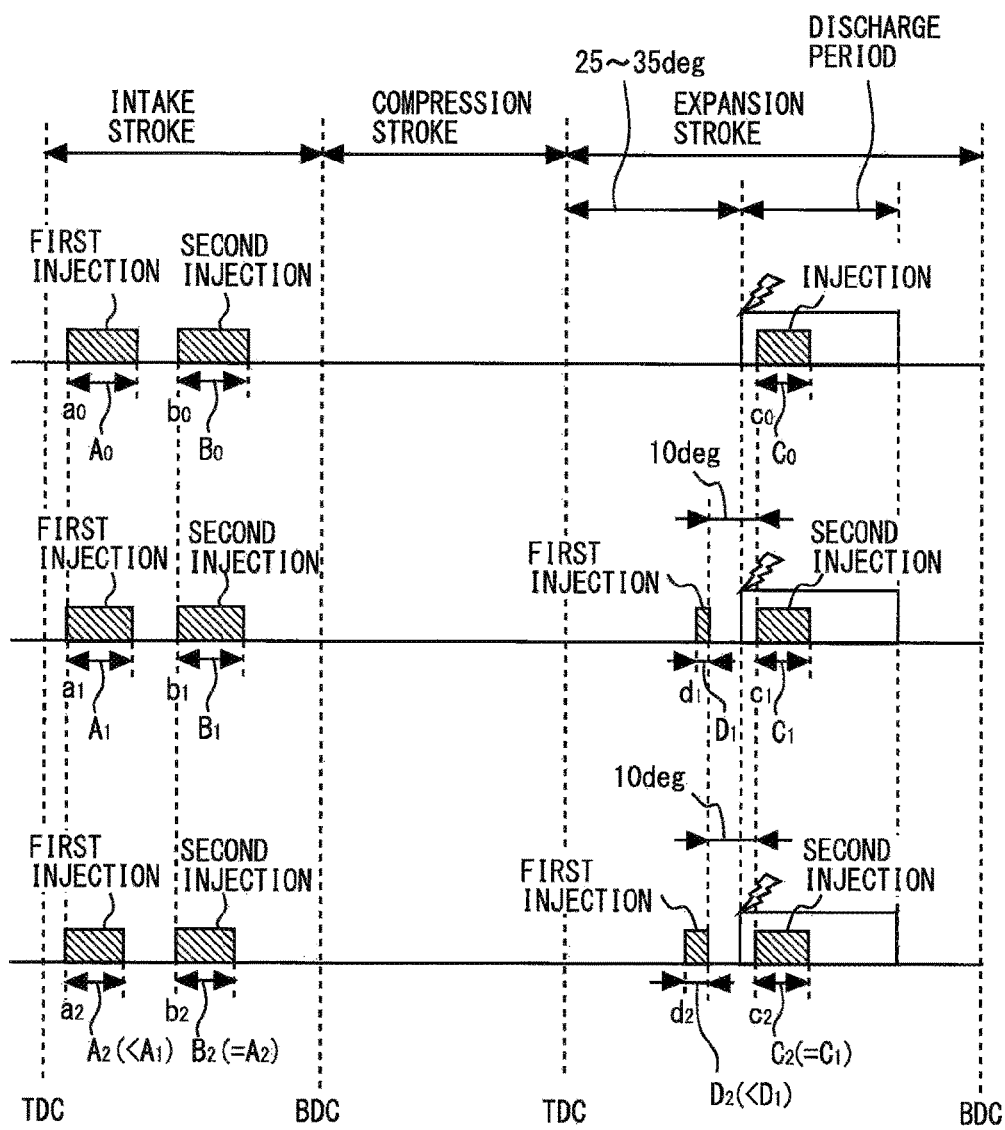
FIG. 16 is a view for describing an overview of catalyst warm-up control according to a second embodiment of the present disclosure.

FIG. 16 is a view for describing an overview of the catalyst warm-up control of the second embodiment of the present disclosure. Similarly to FIG. 7, injection start timings, injection periods and discharge periods at the electrode portion 34 during catalyst warm-up control are illustrated in FIG. 16. In the upper section and middle section of FIG. 16, control is illustrated that is the same as the control illustrated in the upper section and middle section in FIG. 7. Further, the discharge control (start timing and period of discharge) illustrated in FIG. 16 is also the same as the discharge control described with reference to FIG. 7. Therefore, a description of these controls is omitted here.

In the lower section in FIG. 16, control for a case where it is determined that there is an increase in the distance DT is illustrated. In this case, the expansion stroke first injection is started at a crank angle $d_2$, and is performed over an injection period $D_2$. The injection period $D_2$ is set to a longer period than the injection period $D_1$, and a difference between the injection period $D_2$ and the injection period $D_1$ is calculated separately in accordance with the aforementioned crank angle period so as to increase as the aforementioned crank angle period lengthens.

In this case, the expansion stroke second injection is started at a crank angle $c_2$ and is performed over an injection period $C_2$. The crank angle $c_2$ matches the crank angle $c_1$, and the injection period $C_2$ is set to a period that is equal to the injection period $C_1$. Further, an interval between the completion timing of the injection period $D_2$ and the crank angle $c_2$ corresponds to a period (as one example, 10°) that is required in order to charge the injector 30. Therefore, the crank angle $d_2$ is on the advance side relative to the crank angle $d_1$ by an amount corresponding to an amount by which the injection period $D_2$ is longer than the injection period $D_1$.

Further, in the lower section in FIG. 16, a first intake stroke injection is started at a crank angle $a_2$ and a second intake stroke injection is started at a crank angle $b_2$. In this case, the crank angles $a_2$ and $b_2$ match the crank angles $a_1$ and $b_1$. Further, the first injection period $A_2$ and the second injection period $B_2$ of the intake stroke injection are set to equal periods. However, the injection periods $A_2$ and $B_2$ are set to a shorter period than the injection period $A_1$ (=$B_1$). The reason is to make the total injection amount in a single combustion cycle equal in the upper section, middle section and lower section in FIG. 16. Hence, the injection periods $A_2$ and $B_2$ are shorter than the injection period $A_1$ (or injection period $B_1$) by an amount that corresponds to half of the injection period $D_2$ ($A_2$=$B_2$=$A_1$−$D_2$/2).

Figure 17:
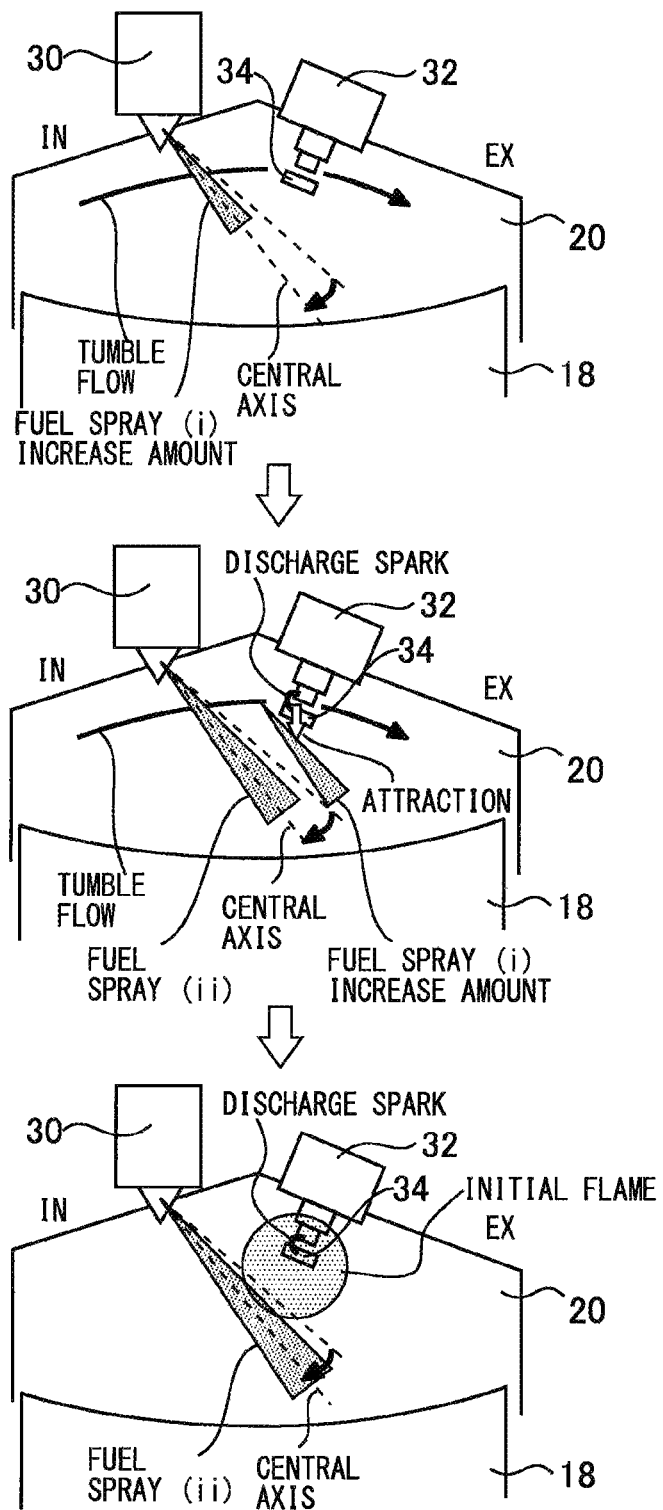
FIG. 17 is a view for describing in-cylinder states in a case of increasing an injection amount for an expansion stroke first injection.

FIG. 17 is a view for describing in-cylinder states in a case of increasing the injection amount for the expansion stroke first injection. The "fuel spray (i)" and "fuel spray (ii)" depicted in FIG. 17 are the same as the corresponding fuel sprays described above with reference to FIG. 8. If the injection amount for the expansion stroke first injection is increased, the fuel spray (i) will disperse over a wider range (upper diagram or middle diagram in FIG. 17). Therefore, an initial flame that arises from a discharge spark and an air-fuel mixture including a fuel spray produced by an intake stroke injection engulfs the fuel spray (i) immediately after the initial flame arises, and grows at once (lower diagram in FIG. 17). Thus, by increasing the injection amount for the expansion stroke first injection in this manner, a time period until the initial flame engulfs the fuel spray (ii) is shortened. Accordingly, even when the aforementioned crank angle period is large, a decrease in the rate of initial combustion is suppressed.

Specific Processing in Second Embodiment

Figure 18:
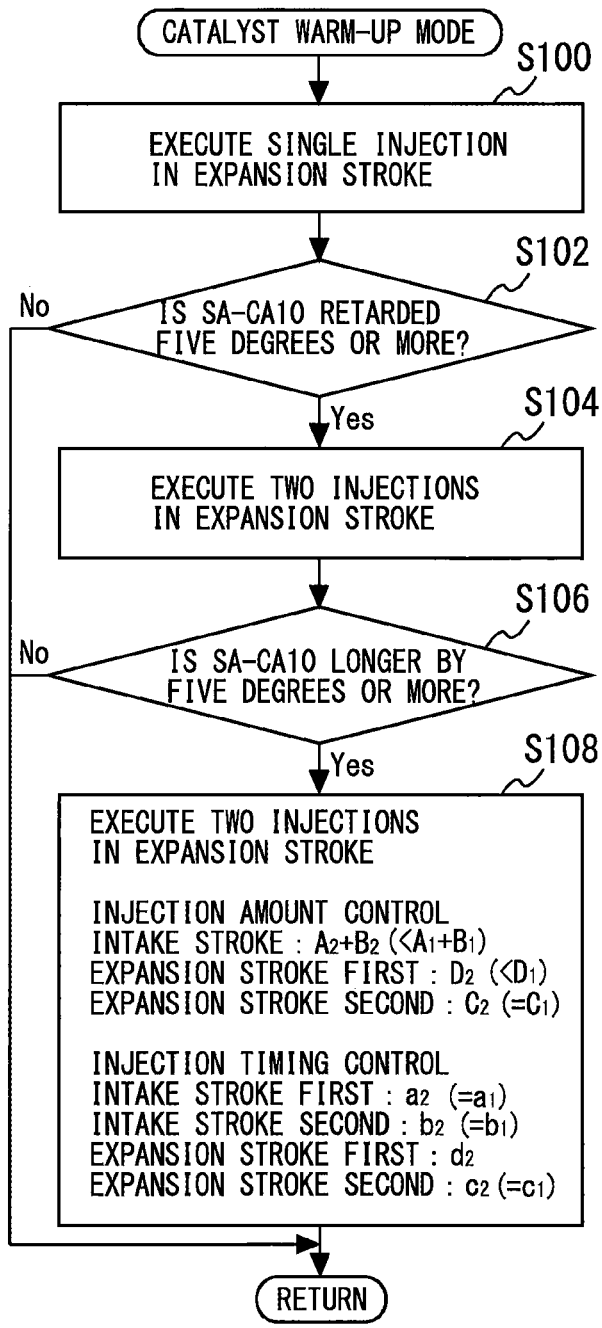
FIG. 18 is a flowchart illustrating an example of processing that the ECU 40 executes in the second embodiment of the present disclosure.

FIG. 18 is a flowchart illustrating one example of processing that the ECU 40 executes in the second embodiment of the present disclosure. Note that the routine shown in FIG. 18 is repeatedly executed during a period in which the catalyst warm-up mode is selected.

In the routine illustrated in FIG. 18, the processing from steps S100 to S104 is executed. The processing in these steps is the same as the processing that is already described above with reference to FIG. 15. Following step S104, the ECU 40 determines whether or not the actual SA-CA10 is longer than the SA-CA10 at a normal time by a predetermined crank angle period or more (step S106). The processing in the present step S106 is identical to the processing in step S102. In the present step S106, if it is determined that the actual SA-CA10 is longer than the SA-CA10 at a normal time by the predetermined crank angle period or more (when the result is "Yes"), the processing proceeds to step S108. In contrast, if it is determined otherwise (when the result is "No"), the ECU 40 exits the present routine.

In step S108, fuel injection control for increasing the injection amount for the expansion stroke first injection is executed. In the present step S108, specifically, injection amounts (injection periods $A_2$ and $B_2$) and injection timings (crank angles $a_2$ and $b_2$) for the intake stroke injections are set. Further, an injection amount (injection period $D_2$ (>injection period $D_1$)) and an injection timing (crank angle $d_2$) for an expansion stroke first injection are set. In addition, an injection amount (injection period $C_2$) and an injection timing (crank angle $c_2$) for an expansion stroke second injection are set.

According to the second embodiment that is described above, the following advantageous effects can be obtained. That is, even when the aforementioned crank angle period is large, the initial combustion can be stabilized by increasing the injection amount of the expansion stroke first injection in accordance with the aforementioned crank angle period, and thus combustion fluctuations can be suppressed. Further, the main combustion can also be stabilized.

Third Embodiment

Next, a third embodiment of the present disclosure will be described referring to FIG. 19 to FIG. 21.

Note that the present embodiment is based on the premise of adopting the system configuration illustrated in FIG. 1, and hence a description of the system configuration is omitted here.

Characteristics of Catalyst Warm-Up Control in Third Embodiment

In the above first embodiment, the expansion stroke first injection is performed when it is determined that there is an increase in the distance DT. Further, in the above second embodiment, an injection amount for the expansion stroke first injection is increased in accordance with the aforementioned crank angle period. However, in some cases, irrespective of the fact that the expansion stroke first injection is performed, it is again determined that there is an increase in the distance DT. Therefore, in the present embodiment, the injection amount for the expansion stroke second injection is increased when it is again determined that there is an increase in the distance DT.

Figure 19:
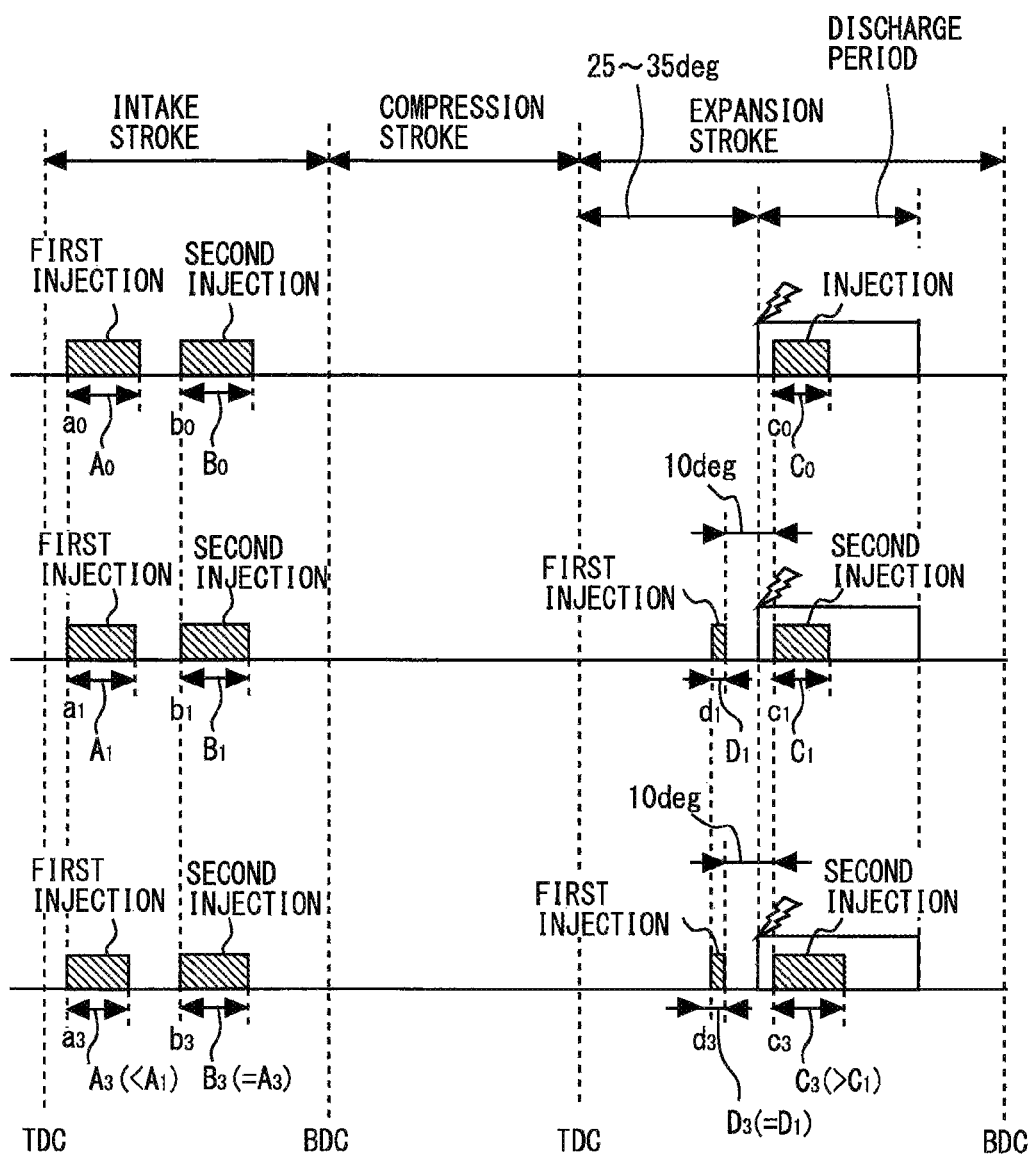
FIG. 19 is a view for describing an overview of catalyst warm-up control according to a third embodiment of the present disclosure.

FIG. 19 is a view for describing an overview of the catalyst warm-up control of the third embodiment of the present disclosure. Similarly to FIG. 7, injection start timings, injection periods and discharge periods at the electrode portion 34 during catalyst warm-up control are illustrated in FIG. 19. In the upper section and middle section in FIG. 19, control is illustrated that is the same as the control illustrated in the upper section and middle section in FIG. 7. Further, the discharge control (start timing and period of discharge) illustrated in FIG. 19 is also the same as the discharge control described with reference to FIG. 7. Therefore, a description of these controls is omitted here.

In the lower section in FIG. 19, control for a case where it is again determined that the distance DT increased is illustrated. In this case, the expansion stroke first injection is started at a crank angle $d_3$, and is performed over an injection period $D_3$. The crank angle $d_3$ matches the crank angle $d_1$, and the injection period $D_3$ is set to a period that is equal to the injection period $D_1$. Further, the expansion stroke second injection is started at the crank angle $c_3$, and is performed over an injection period $C_3$. Although the crank angle $c_3$ matches the crank angle $c_1$, the injection period $C_3$ is set to a longer period than the injection period $C_1$.

Further, in the lower section in FIG. 19, a first intake stroke injection is started at a crank angle $a_3$ and a second intake stroke injection is started at a crank angle $b_3$. In this case, the crank angles $a_3$ and $b_3$ match the crank angles $a_1$ and $b_1$. Further, a first injection period $A_3$ and a second injection period $B_3$ of the intake stroke injections are set to equal periods. However, the injection periods $A_3$ and $B_3$ are set to a shorter period than the injection period $A_1$ (=$B_1$). The reason is to make the total injection amount in a single combustion cycle equal in the upper section, middle section and lower section in FIG. 19. Hence, the injection periods $A_3$ and $B_3$ are shorter than the injection period $A_1$ (or injection period $B_1$) by an amount that corresponds to half of the injection period ($C_3$−$C_1$) (i.e. $A_3$=$B_3$=$A_1$−{($C_3$−$C_1$)/2}).

Figure 20:
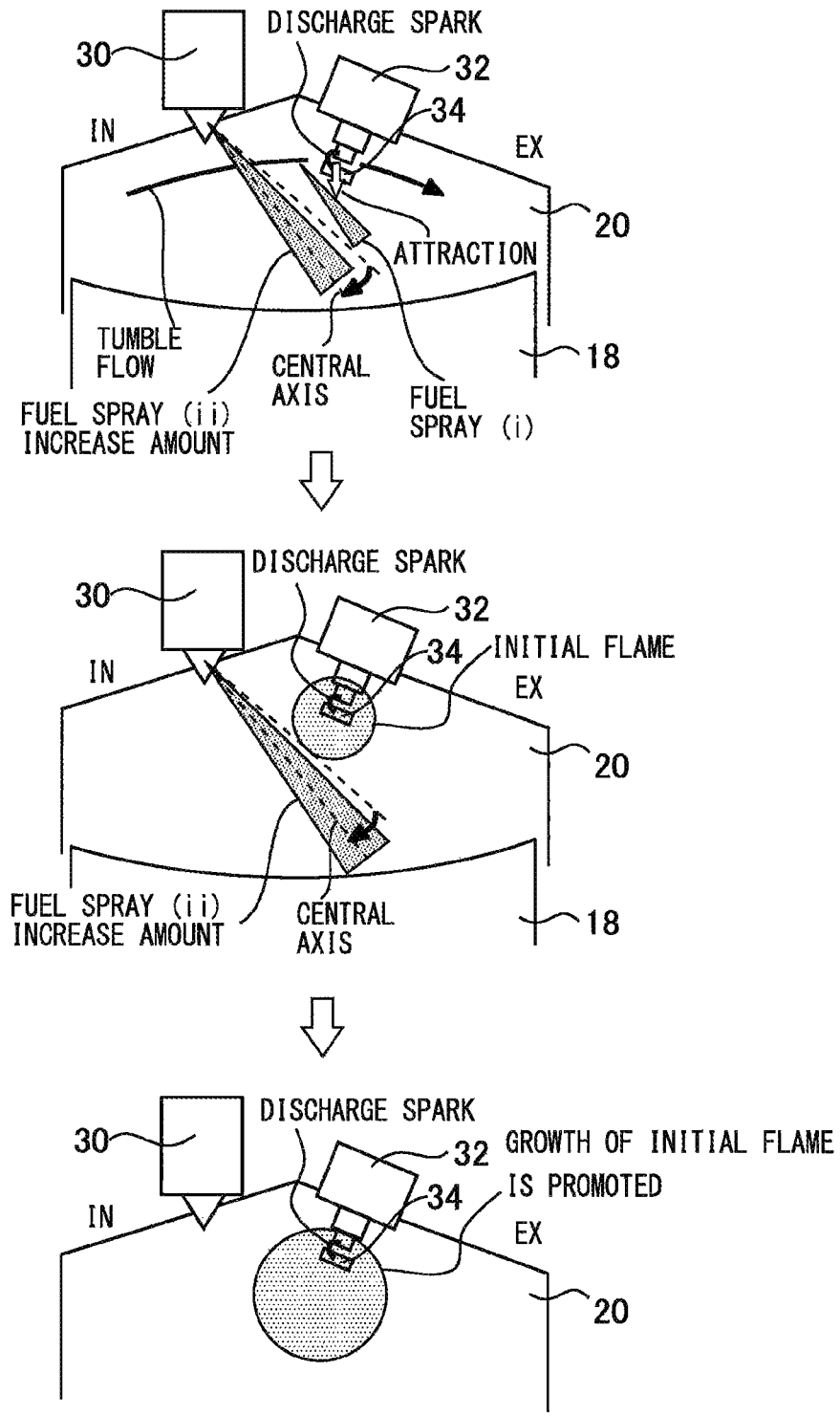
FIG. 20 is a view for describing in-cylinder states in a case of increasing an injection amount for an expansion stroke second injection.

FIG. 20 is a view for describing in-cylinder states in a case of increasing the injection amount for the expansion stroke second injection. The "fuel spray (i)" and "fuel spray (ii)" depicted in FIG. 20 are the same as the corresponding fuel sprays described above with reference to FIG. 8. If the injection amount for the expansion stroke second injection is increased, the fuel spray (ii) will disperse over a wider range (upper diagram or middle diagram in FIG. 20). Therefore, a time period until an initial flame that grows by engulfing the fuel spray (i) further engulfs the fuel spray (ii) that dispersed over a wider range is shortened (lower diagram in FIG. 20). Hence, even when it is again determined that the distance DT increased, a decrease in the rate of initial combustion is suppressed.

Specific Processing in Third Embodiment

Figure 21:
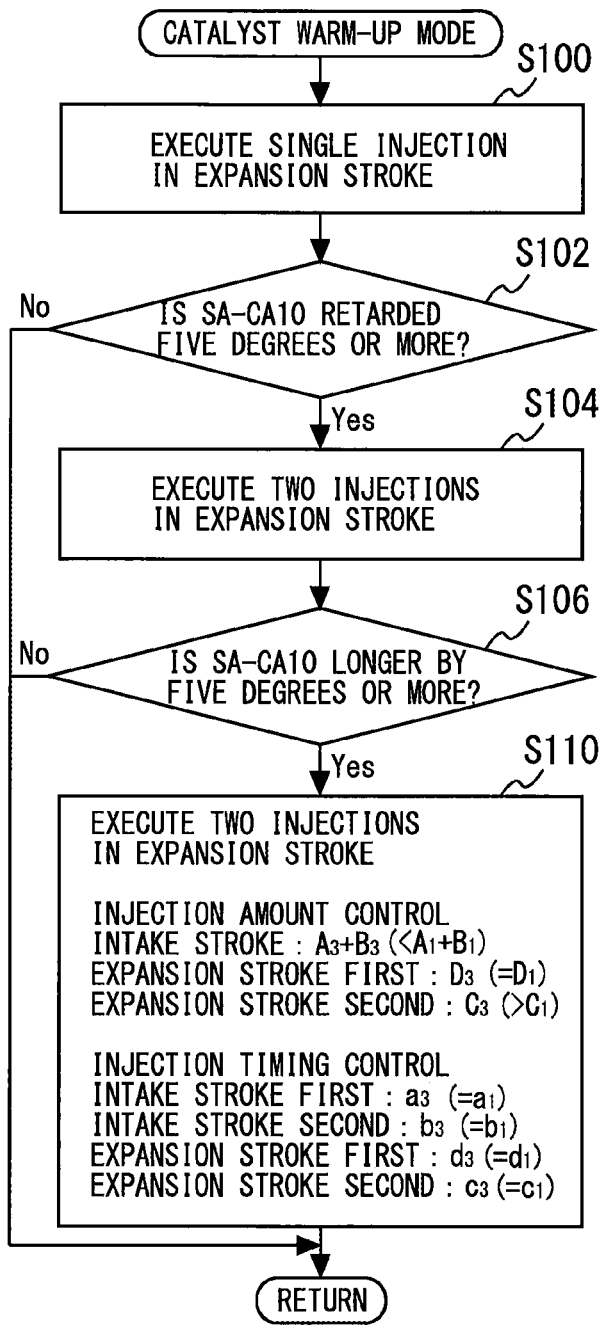
FIG. 21 is a flowchart illustrating an example of processing that the ECU 40 executes in the third embodiment of the present disclosure.

FIG. 21 is a flowchart illustrating one example of processing that the ECU 40 executes in the third embodiment of the present disclosure. Note that, the routine shown in FIG. 21 is repeatedly executed during a period in which the catalyst warm-up mode is selected.

In the routine illustrated in FIG. 21, the processing from steps S100 to S106 is executed. The processing in these steps is the same as the processing that is already described with reference to FIG. 18. However, in the present routine, in step S106, if it is determined that the actual SA-CA10 is longer than the SA-CA10 at a normal time by the predetermined crank angle period or more (when the result is "Yes"), the processing proceeds to step S110.

In step S110, fuel injection control that increases the injection amount for the expansion stroke second injection is executed. In the present step S110, specifically, injection amounts (injection periods $A_3$ and $B_3$) and injection timings (crank angles $a_3$ and $b_3$) for the intake stroke injections are set. Further, an injection amount (injection period $D_3$) and an injection timing (crank angle $d_3$) for the expansion stroke first injection are set. In addition, an injection amount (injection period $C_3$ (>injection period $C_1$)) and an injection timing (crank angle $c_3$) for the expansion stroke second injection are set.

According to the third embodiment that is described above, the following advantageous effects can be obtained. That is, even when it is again determined that there is an increase in the distance DT, the initial combustion can be stabilized by increasing the injection amount of the expansion stroke second injection, and thus combustion fluctuations can be suppressed. Further, the main combustion can also be stabilized.

Fourth Embodiment

Next, a fourth embodiment of the present disclosure will be described referring to FIG. 22 to FIG. 24.

Note that the present embodiment is based on the premise of adopting the system configuration illustrated in FIG. 1, and hence a description of the system configuration is omitted here.

Characteristics of Catalyst Warm-Up Control in Fourth Embodiment

In the above third embodiment, if it is again determined that there is an increase in the distance DT, the injection amount for the expansion stroke second injection is increased. According to the present embodiment, if it is again determined that there is an increase in the distance DT, the injection amount for the expansion stroke second injection is not increased, but rather the start timing of the two injections in the expansion stroke (that is, the expansion stroke first injection and expansion stroke second injection) and the discharge are advanced.

Figure 22:
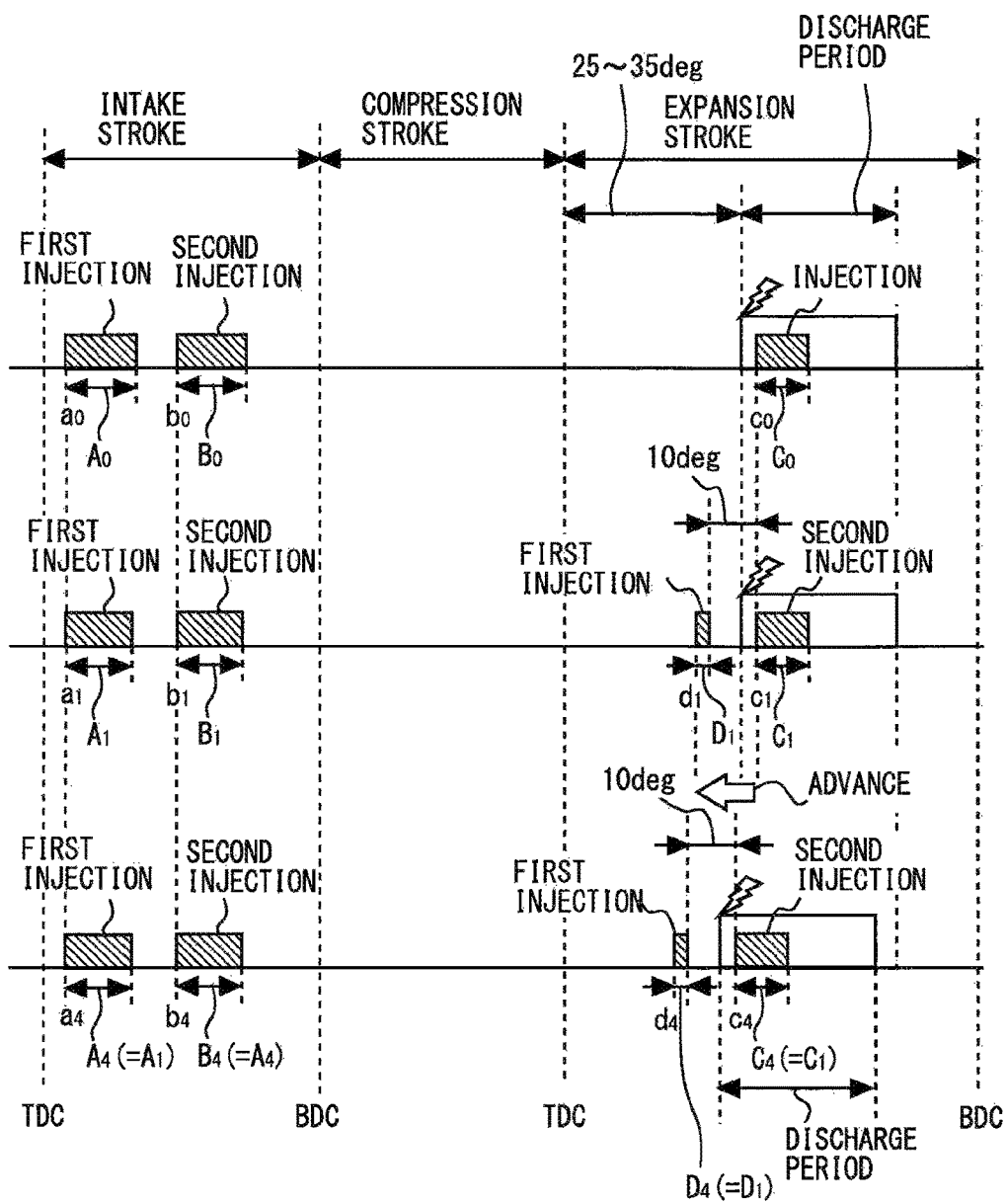
FIG. 22 is a view for describing an overview of catalyst warm-up control according to a fourth embodiment of the present disclosure.

FIG. 22 is a view for describing an overview of the catalyst warm-up control of the fourth embodiment of the present disclosure. Similarly to FIG. 7, injection start timings, injection periods and discharge periods at the electrode portion 34 during catalyst warm-up control are illustrated in FIG. 22. In the upper section and middle section in FIG. 22, control is illustrated that is the same as the control illustrated in the upper section and middle section in FIG. 7. Therefore, a description of these controls is omitted here.

In the lower section in FIG. 22, control for a case where it is again determined that there is an increase in the distance DT increased is illustrated. In this case, the expansion stroke first injection is started at a crank angle $d_4$, and is performed over an injection period $D_4$. Further, the expansion stroke second injection is started at a crank angle $c_4$, and is performed over an injection period $C_4$. The injection periods $C_4$ and $D_4$ are set to periods that are equal to the injection periods $C_1$ and $D_1$. However, the crank angles $c_4$ and $d_4$ are set further on the advance side relative to the crank angles $c_1$ and $d_1$. The discharge period illustrated in the lower section in FIG. 22 is set to a period that is equal to the discharge periods shown in the upper section and middle section in FIG. 22. However, the start timing of the discharge illustrated in the lower section in FIG. 22 is set further on the advance side relative to the start timing of the discharges illustrated in the upper section and middle section in FIG. 22.

In this connection, the reason the crank angle $d_4$ is set further on the advance side relative to the crank angle $d_1$ is that the crank angle $d_4$ is advanced by the same amount as the advancement amount of the crank angle $c_1$ to make an interval between the completion timing of the injection period $D_4$ and the crank angle $c_4$ correspond to a period that is required to charge the injector 30. Accordingly, when, for instance, the interval between the completion timing of the injection period $D_4$ and the crank angle $c_4$ is set longer than a period (as one example, 10°) that is required to charge the injector 30 and there is some surplus time in the interval, the crank angle $d_4$ and the crank angle $d_1$ may be set to match each other without advancing the crank angle $d_4$.

Further, in the lower section in FIG. 22, a first intake stroke injection is started at a crank angle $a_4$ and a second intake stroke injection is started at a crank angle $b_4$. In this case, the crank angles $a_4$ and $b_4$ match the crank angles $a_1$ and $b_1$. Further, a first injection period $A_4$ and a second injection period $B_4$ of the intake stroke injections are set to equal periods. Furthermore, the injection periods $A_4$ and $B_4$ are set to a period that is equal to the injection period $A_1$ (=$B_1$).

Figure 23:
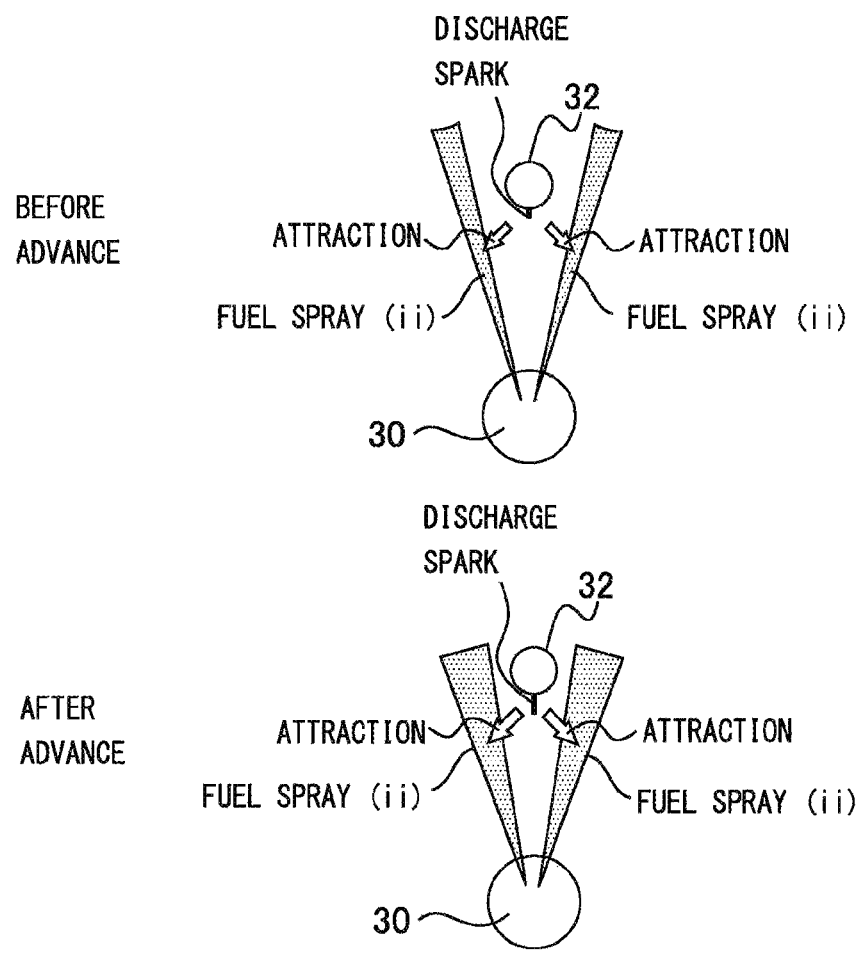
FIG. 23 is a view for describing in-cylinder states in a case of advancing the start timings of two injections and a discharge in an expansion stroke.

FIG. 23 is a view for describing in-cylinder states in a case of advancing the start timing of the two injections and the discharge in the expansion stroke. Note that, for convenience of description, among fuel sprays produced by the expansion stroke second injection, only two fuel sprays (ii) that approach the spark plug 32 are illustrated in FIG. 23. In the upper diagram in FIG. 23, for comparison purposes, an in-cylinder state prior to advancing the start timing of the two injections and the discharge in the expansion stroke is depicted. As can be understood by comparing the upper diagram and lower diagram in FIG. 23, when the start timing of the two injections and the discharge in the expansion stroke are advanced, the respective fuel sprays (ii) shrink in the travelling directions thereof and become thick. The reason is that, when the start timing of the discharge is advanced, the in-cylinder pressure rises in comparison to a case where the start timing of the discharge is not advanced, and it becomes difficult for the fuel sprays (ii) to disperse in the respective travelling directions thereof. If the fuel spray (ii) becomes thick, the distance between the fuel spray (ii) and the spark plug 32 (electrode portion 34) shortens. Consequently, a time period until an initial flame that grows by engulfing the fuel spray (i) further engulfs the fuel spray (ii) is shortened. Hence, even when it is again determined that the distance DT increased, a decrease in the rate of initial combustion is suppressed.

Specific Processing in Fourth Embodiment

Figure 24:
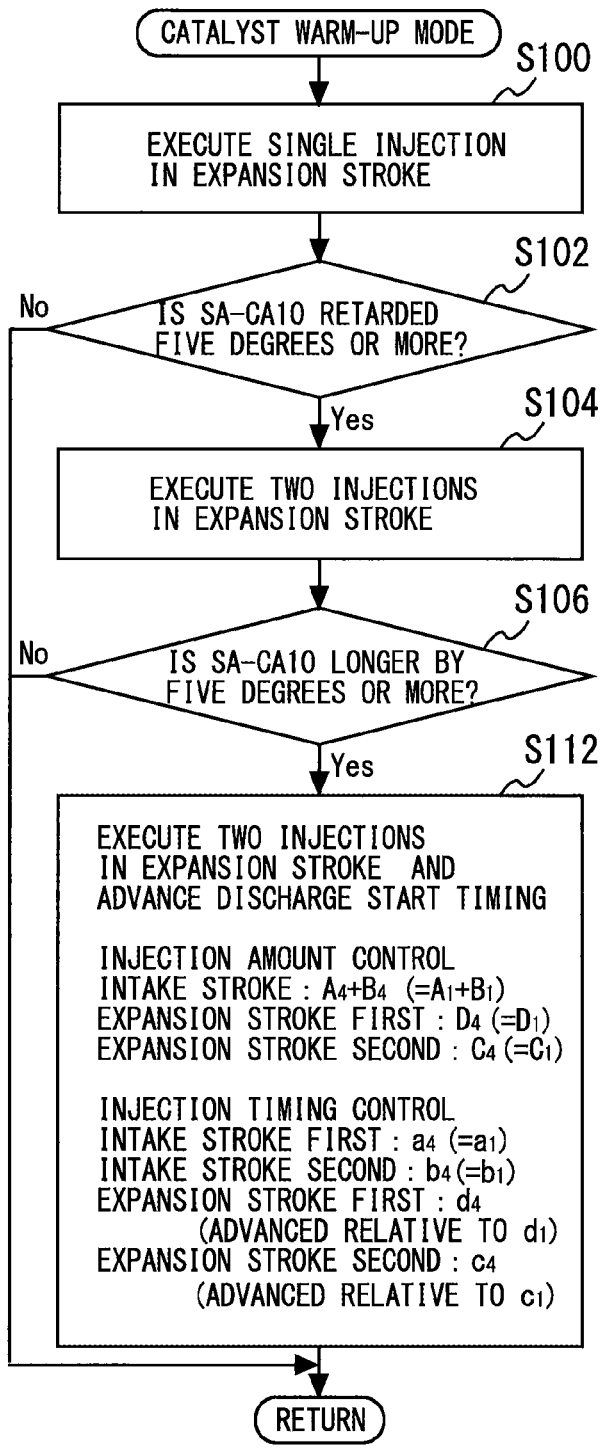
FIG. 24 is a flowchart illustrating an example of processing that the ECU 40 executes in the fourth embodiment of the present disclosure.

FIG. 24 is a flowchart illustrating one example of processing that the ECU 40 executes in the fourth embodiment of the present disclosure. Note that the routine shown in FIG. 24 is repeatedly executed during a period in which the catalyst warm-up mode is selected.

In the routine illustrated in FIG. 24, the processing from steps S100 to S106 is executed. The processing in these steps is the same as the processing that is already described with reference to FIG. 18. However, in the present routine, in step S106, if it is determined that the actual SA-CA10 is longer than the SA-CA10 at a normal time by the predetermined crank angle period or more (when the result is "Yes"), the processing proceeds to step S112.

In step S112, fuel injection control that advances the start timing of two injections in the expansion stroke, and discharge control that advances that start timing of the discharge are executed. In the present step S112, specifically, injection amounts (injection periods $A_4$ and $B_4$) and injection timings (crank angles $a_4$ and $b_4$) for intake stroke injections are set. Further, an injection amount (injection period $D_4$) of the expansion stroke first injection and an injection amount (injection period $C_4$) of the expansion stroke second injection are set. In addition, an injection timing (crank angle $d_4$) of the expansion stroke first injection and an injection timing (crank angle $c_4$) of the expansion stroke second injection are set on the advance side. Furthermore, the start timing of the discharge is also set on the advance side by an amount that is equal to the advanced amount of these injection timings.

According to the fourth embodiment that is described above, the following advantageous effects can be obtained. That is, even when it is again determined that the distance DT increased, the initial combustion can be stabilized by advancing the start timing of the two injections and the discharge in the expansion stroke, and thus combustion fluctuations can be suppressed. Further, the main combustion can also be stabilized.

Fifth Embodiment

Next, a fifth embodiment of the present disclosure will be described referring to FIG. 25 to FIG. 26.

Note that the present embodiment is based on the premise of adopting the system configuration illustrated in FIG. 1, and hence a description of the system configuration is omitted here.

Characteristics of Catalyst Warm-Up Control in Fifth Embodiment

In the above first embodiment, the expansion stroke first injection is performed when it is determined that there is an increase in the distance DT. However, in some cases it is determined that the distance DT decreases too much as a result of performing the expansion stroke first injection. From the viewpoint of securing the rate of initial combustion, there is no problem even if the distance DT decreases too much. However, if the distance DT decreases too much, it is expected that the initial flame will grow at an early stage, and there will be a greater distance between the initial flame and a fuel spray (that is, a fuel spray produced by an intake stroke injection) that swirls inside the combustion chamber 20 together with the tumble flow. Consequently, there is a possibility that it will not be possible to smoothly transition from the initial combustion to the main combustion.

Therefore, according to the present embodiment, if it is determined that the distance DT decreases too much as the result of performing the expansion stroke first injection, the injection amount for the expansion stroke second injection is reduced. That is, control that is the opposite to the control of the third embodiment is performed. A determination regarding the distance DT is made using SA-CA10, similarly to the foregoing first embodiment. Specifically, in the present embodiment, it is determined that the distance DT decreases too much if the actual SA-CA10 is shorter than the SA-CA10 at a normal time by a predetermined crank angle period (as one example, 5°) or more. Note that, SA-CA10 that is shorter than the SA-CA10 at a normal time by an amount corresponding to a predetermined crank angle period is set after determining "SA-CA10 at a normal time" in advance by adaptation.

Figure 25:
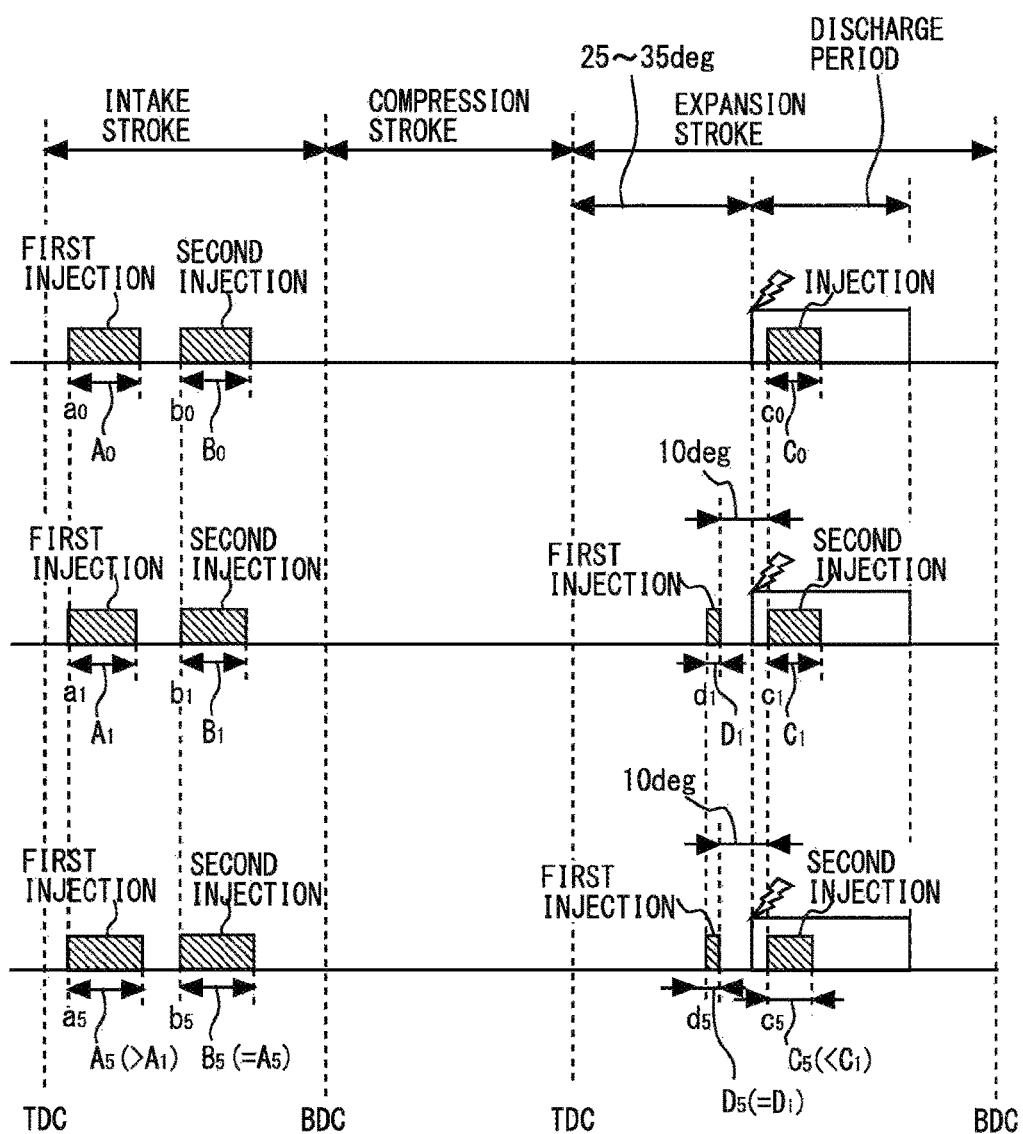
FIG. 25 is a view for describing an overview of catalyst warm-up control according to a fifth embodiment of the present disclosure.

FIG. 25 is a view for describing an overview of catalyst warm-up control of the fifth embodiment of the present disclosure. Similarly to FIG. 7, injection start timings, injection periods and discharge periods at the electrode portion 34 during catalyst warm-up control are illustrated in FIG. 25. In the upper section and middle section in FIG. 25, control is illustrated that is the same as the control illustrated in the upper section and middle section in FIG. 7. Further, the discharge control (start timing and period of discharge) illustrated in FIG. 25 is also the same as the discharge control described with reference to FIG. 7. Therefore, a description of these controls is omitted here.

In the lower section in FIG. 25, control for a case where it is determined that the distance DT decreases too much is illustrated. In this case, the expansion stroke first injection is started at a crank angle $d_5$, and is performed over an injection period $D_5$. The crank angle $d_5$ matches the crank angle $d_1$, and the injection period $D_5$ is set to a period that is equal to the injection period $D_1$. Further, the expansion stroke second injection is started at a crank angle $c_5$, and is performed over an injection period $C_5$. Although the crank angle $c_5$ matches the crank angle $c_1$, the injection period $C_5$ is set to a shorter period than the injection period $C_1$.

Further, in the lower section in FIG. 25, a first intake stroke injection is started at a crank angle $a_5$ and a second intake stroke injection is started at a crank angle $b_5$. In this case, the crank angles $a_5$ and $b_5$ match the crank angles $a_1$ and $b_1$. Further, a first injection period $A_5$ and a second injection period $B_5$ of the intake stroke injections are set to equal periods. However, the injection periods $A_5$ and $B_5$ are set to a longer period than the injection period $A_1$ (=$B_1$). The reason is to make the total injection amount in a single combustion cycle equal in the upper section, middle section and lower section in FIG. 25. Hence, the injection periods $A_5$ and $B_5$ are longer than the injection period $A_1$ (or injection period $B_1$) by an amount that corresponds to half of the injection period ($C_1$–$C_5$) (i.e. $A_5$=$B_5$=$A_1$+{($C_1$–$C_5$)/2}).

An in-cylinder state when the injection amount for the expansion stroke second injection is decreased can be described by assuming that "fuel spray (ii)" shown in FIG. 20 is decreased. That is, if the injection amount for the expansion stroke second injection is decreased, a range in which a fuel spray produced by the expansion stroke second injection (that is, the fuel spray (ii) in FIG. 20) disperses decreases. Therefore, it takes time until an initial flame that grows by engulfing the fuel spray (i) further engulfs the fuel spray (ii), and as a result the rate of initial combustion becomes slow. Hence, the rate of initial combustion can be confined within a moderate range and a transition from the initial combustion to the main combustion can be stabilized.

Specific Processing in Fifth Embodiment

Figure 26:
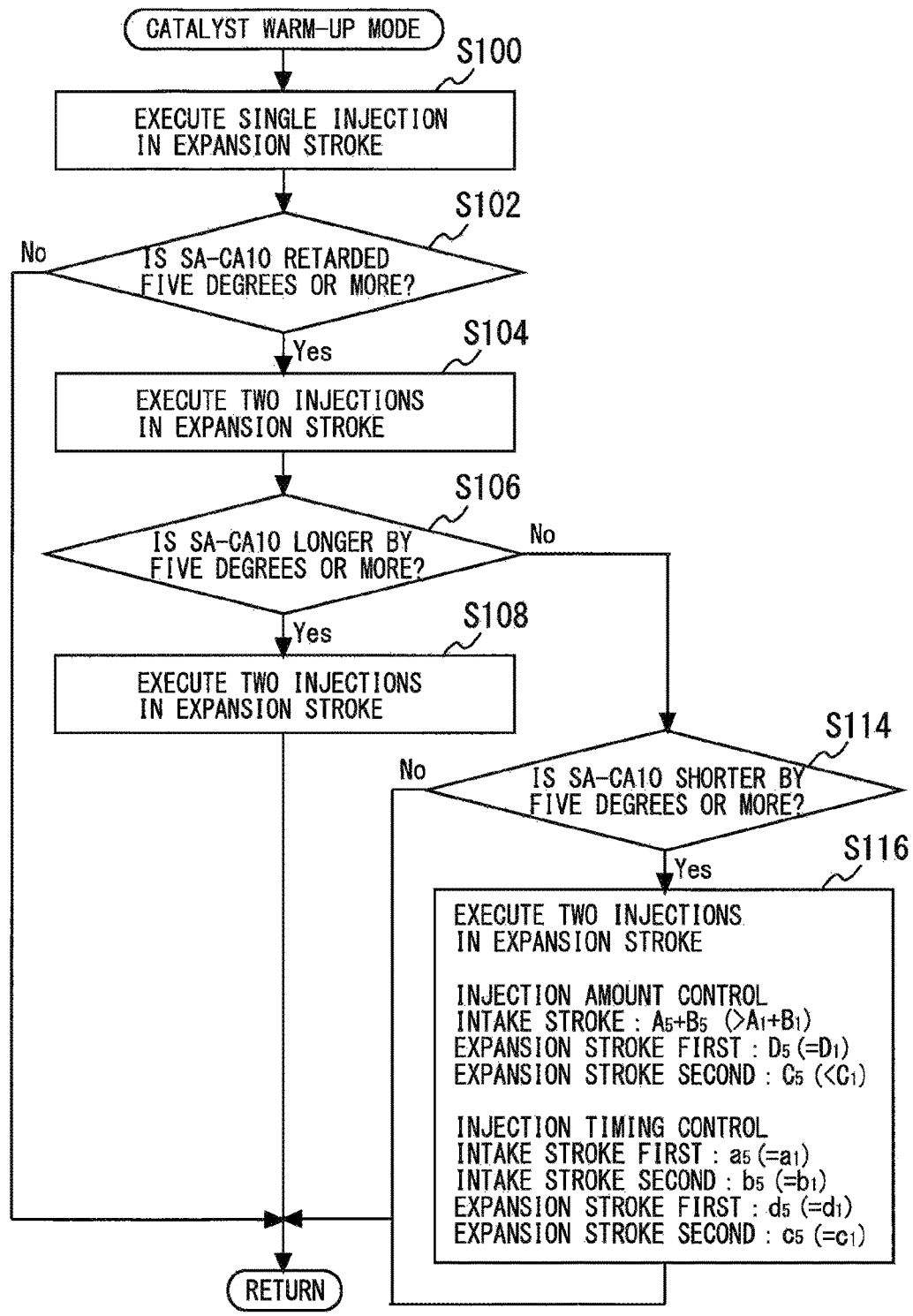
FIG. 26 is a flowchart illustrating an example of processing that the ECU 40 executes in the fifth embodiment of the present disclosure.

FIG. 26 is a flowchart illustrating one example of processing that the ECU 40 executes in the fifth embodiment of the present disclosure. Note that the routine shown in FIG. 26 is repeatedly executed during a period in which the catalyst warm-up mode is selected.

In the routine illustrated in FIG. 26, the processing from steps S100 to S108 is executed. The processing in these steps is the same as the processing that is already described with reference to FIG. 18. However, in the present routine, in step S106, if it is determined that the actual SA-CA10 is not longer than the SA-CA10 at a normal time by the predetermined crank angle period or more (when the result is "No"), the processing proceeds to step S114. Note that, the processing in step S110 in FIG. 21 or the processing in step S112 in FIG. 24 may be performed instead of the processing in step S108 in FIG. 26.

In step S114, the ECU 40 determines whether or not the actual SA-CA10 is shorter than the SA-CA10 at a normal time by a predetermined crank angle period or more. In the present step S114, the actual SA-CA10 that is calculated separately in the ECU 40 is acquired, and is compared with the SA-CA10 at a normal time (setting value). If it is determined as a result of the comparison that the actual SA-CA10 is shorter than the SA-CA10 at a normal time by the predetermined crank angle period or more (when the result is "Yes"), the processing proceeds to step S116. In contrast, if it is determined otherwise (when the result is "No"), the ECU 40 exits the present routine.

In step S116, fuel injection control that decreases the injection amount for the expansion stroke second injection is executed. In the present step S116, specifically, injection amounts (injection periods $A_5$ and $B_5$) and injection timings (crank angles $a_5$ and $b_5$) for the intake stroke injections are set. Further, an injection amount (injection period $D_5$) and an injection timing (crank angle $d_5$) for an expansion stroke first injection are set. In addition, an injection amount (injection period $C_5$ (<injection period $C_1$)) and an injection timing (crank angle $c_5$) for the expansion stroke second injection are set.

According to the fifth embodiment that is described above, the following advantageous effect can be obtained. That is, if it is determined that the distance DT decreases too much, the rate of initial combustion can be confined within a moderate range and a transition from the initial combustion to the main combustion can be stabilized by decreasing the injection amount for the expansion stroke second injection.

Modification of Fifth Embodiment

In the above fifth embodiment, a determination regarding a decrease in the distance DT is made utilizing SA-CA10. However, instead of SA-CA10, a determination regarding a decrease in the distance DT may be made using a known parameter having a correlation with the rate of initial combustion. That is, as long as a parameter is a known parameter with respect to a determination value (second determination value) of which the rate of initial combustion can be compared, the parameter can be used instead of SA-CA10. Note that the present modification can be similarly applied to the sixth to eighth embodiments that are described later.

Sixth Embodiment

Next, a sixth embodiment of the present disclosure will be described referring to FIG. 27 to FIG. 28.

Note that the present embodiment is based on the premise of adopting the system configuration illustrated in FIG. 1, and hence a description of the system configuration is omitted here.

Characteristics of Catalyst Warm-Up Control in Sixth Embodiment

In the above fifth embodiment, if it is determined that the distance DT decreases too much as the result of performing an expansion stroke first injection, the injection amount for the expansion stroke second injection is reduced. In the present embodiment, if it is determined that the distance DT decreases too much, the injection amount for the expansion stroke second injection is not reduced, and instead the start timing of the expansion stroke second injection is retarded.

Figure 27:
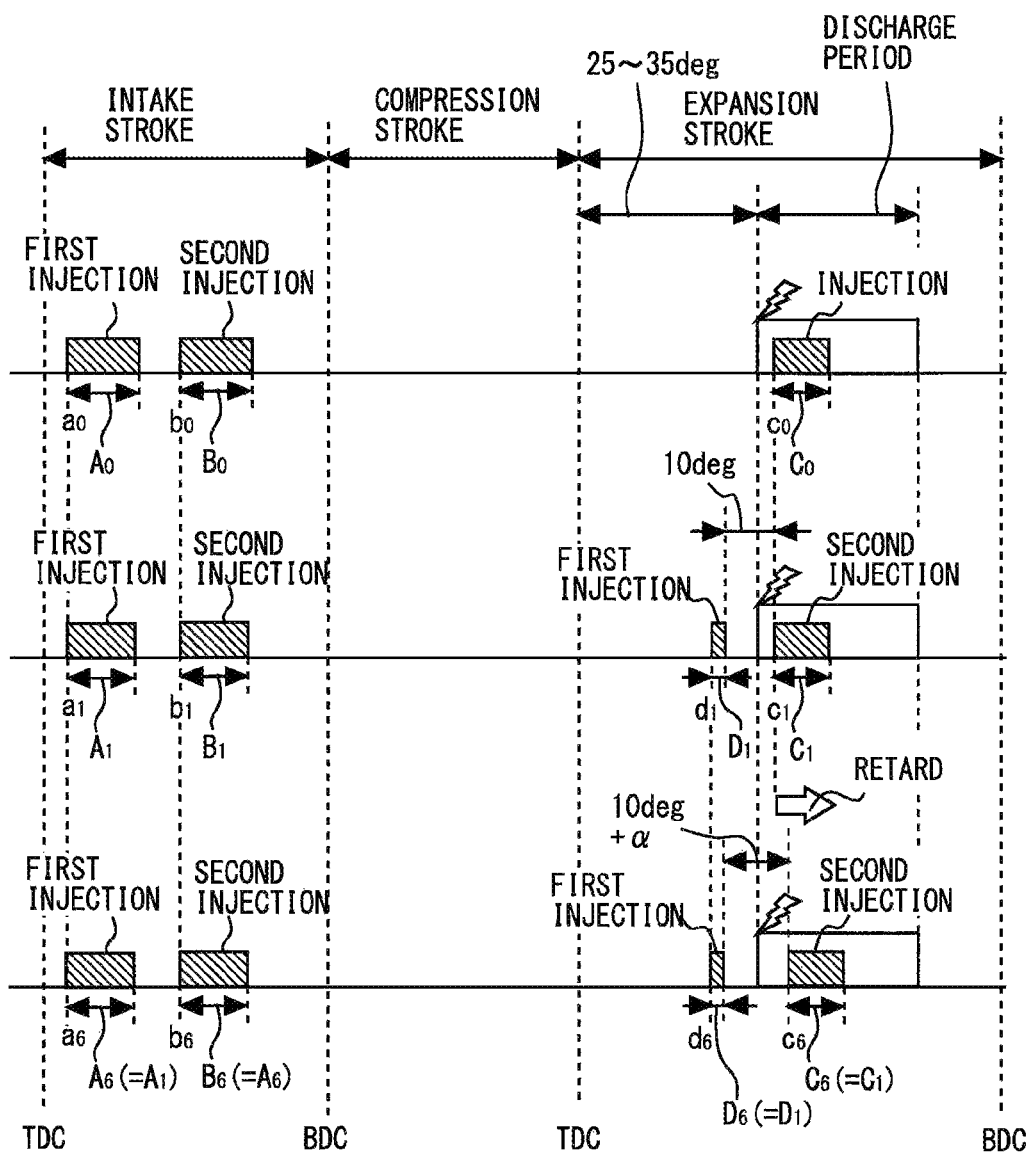
FIG. 27 is a view for describing an overview of catalyst warm-up control according to a sixth embodiment of the present disclosure.

FIG. 27 is a view for describing an overview of the catalyst warm-up control of the sixth embodiment of the present disclosure. Similarly to FIG. 7, injection start timings, injection periods and discharge periods at the electrode portion 34 during catalyst warm-up control are illustrated in FIG. 27. In the upper section and middle section in FIG. 27, control is illustrated that is the same as the control illustrated in the upper section and middle section in FIG. 7. Further, the discharge control (start timing and period of discharge) illustrated in FIG. 27 is also the same as the discharge control described with reference to FIG. 7. Therefore, a description of these controls is omitted here.

In the lower section in FIG. 27, control for a case where it is determined that the distance DT decreases too much is illustrated. In this case, the expansion stroke first injection is started at a crank angle $d_6$, and is performed over an injection period $D_6$. The crank angle $d_6$ matches the crank angle $d_1$, and the injection period $D_6$ is set to a period that is equal to the injection period $D_1$. Further, the expansion stroke second injection is started at a crank angle $c_6$, and is performed over an injection period $C_6$. Although the injection period $C_6$ is set to a period that is equal to the injection period $C_1$, the crank angle $c_6$ is set further on the retard side relative to the crank angle $c_1$. Consequently, an interval between the crank angle $c_6$ and the completion timing of the injection period $D_6$ expands ($10°+\alpha$) to an interval that is greater than a period required to charge the injector 30 (as one example, $10°$).

Further, in the lower section in FIG. 27, a first intake stroke injection is started at a crank angle $a_6$ and a second intake stroke injection is started at a crank angle $b_6$. In this case, the crank angles $a_6$ and $b_6$ match the crank angles $a_1$ and $b_1$. Further, a first injection period $A_6$ and a second injection period $B_6$ of the intake stroke injections are set to equal periods. Furthermore, the injection periods $A_6$ and $B_6$ are set to a period that is equal to the injection period $A_1$ ($=B_1$).

If the start timing of the expansion stroke second injection is retarded, it takes time until an initial flame that grows by engulfing a fuel spray produced by the expansion stroke first injection further engulfs a fuel spray produced by the expansion stroke second injection, and as a result the rate of initial combustion becomes slow. Hence, the rate of initial combustion can be confined within a moderate range and a transition from the initial combustion to the main combustion can be stabilized.

Specific Processing in Sixth Embodiment

Figure 28:
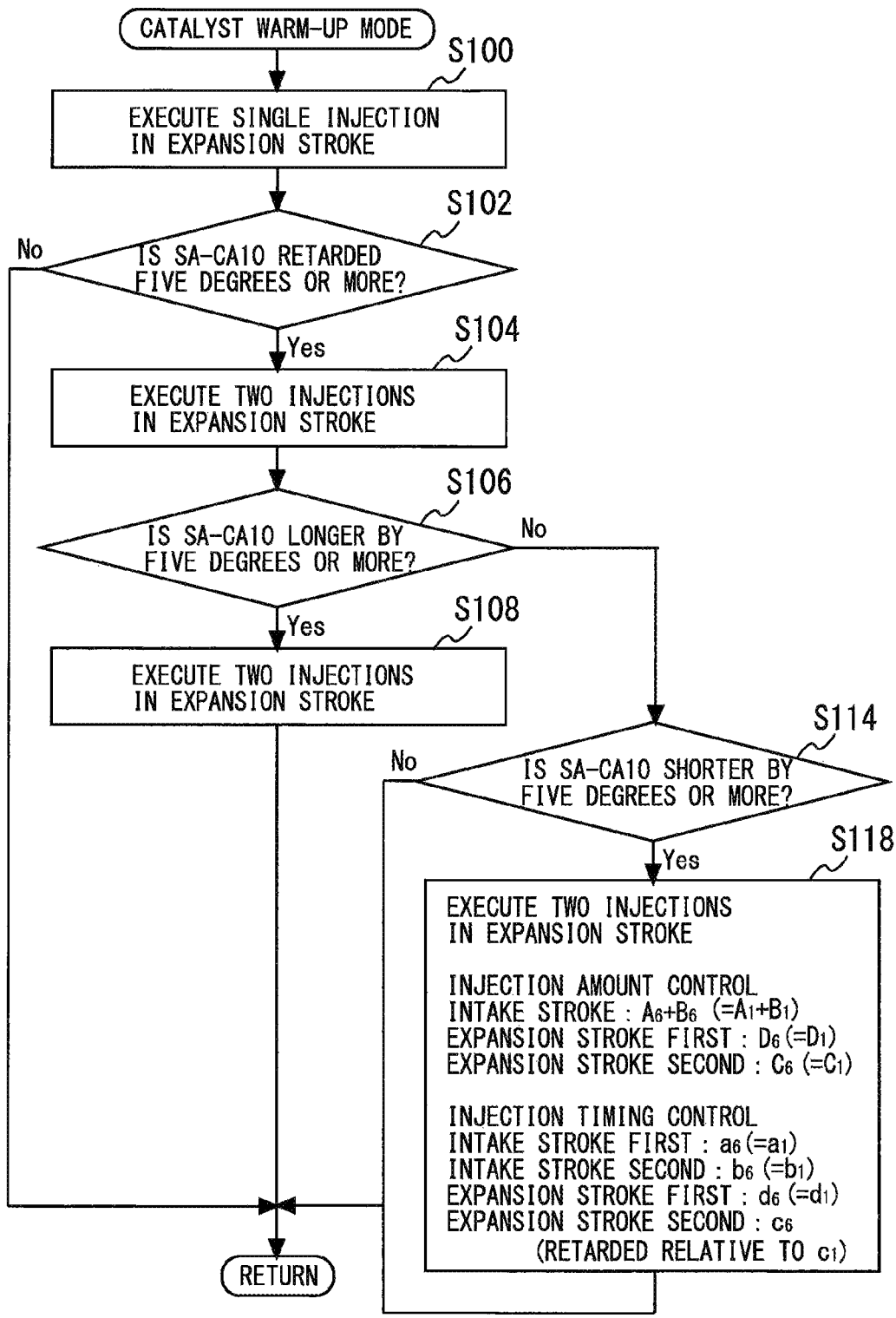
FIG. 28 is a flowchart illustrating an example of processing that the ECU 40 executes in the sixth embodiment of the present disclosure.

FIG. 28 is a flowchart illustrating one example of processing that the ECU 40 executes in the sixth embodiment of the present disclosure. Note that, the routine shown in FIG. 28 is repeatedly executed during a period in which the catalyst warm-up mode is selected.

In the routine illustrated in FIG. 28, the processing from steps S100 to S108 and S114 is executed. The processing in these steps is the same as the processing that is already described with reference to FIG. 26. However, in the present routine, in step S114, if it is determined that the actual SA-CA10 is shorter than the SA-CA10 at a normal time by the predetermined crank angle period or more (when the result is "Yes"), the processing proceeds to step S118.

In step S118, fuel injection control for retarding the start timing of the expansion stroke second injection is executed. In the present step S118, specifically, the injection amounts (injection periods $A_6$ and $B_6$) and the injection timings (crank angles $a_6$ and $b_6$) for the intake stroke injections are set. Further, the injection amount (injection period $D_6$) and the injection timing (crank angle $d_6$) for the expansion stroke first injection are set. In addition, the injection amount (injection period $C_6$) for the expansion stroke second injection is set. Furthermore, the injection timing (crank angle $c_6$) is set on the retard side.

According to the sixth embodiment that is described above, the following advantageous effect can be obtained. That is, if it is determined that the distance DT decreases too much, the rate of initial combustion can be confined within a moderate range and a transition from the initial combustion to the main combustion can be stabilized by retarding the start timing of the expansion stroke second injection.

Seventh Embodiment

Next, a seventh embodiment of the present disclosure will be described referring to FIG. 29 to FIG. 30.

Note that the present embodiment is based on the premise of adopting the system configuration illustrated in FIG. 1, and hence a description of the system configuration is omitted here.

Characteristics of Catalyst Warm-Up Control in Seventh Embodiment

In the above fifth embodiment, if it is determined that the distance DT decreases too much, the injection amount for the expansion stroke second injection is reduced. Further, in the above sixth embodiment, if it is determined that the distance DT decreases too much, the start timing of the expansion stroke second injection is retarded. In the present embodiment, the injection amount or start timing of the expansion stroke second injection is not changed, and instead the start timing of the discharge is advanced.

Figure 29:
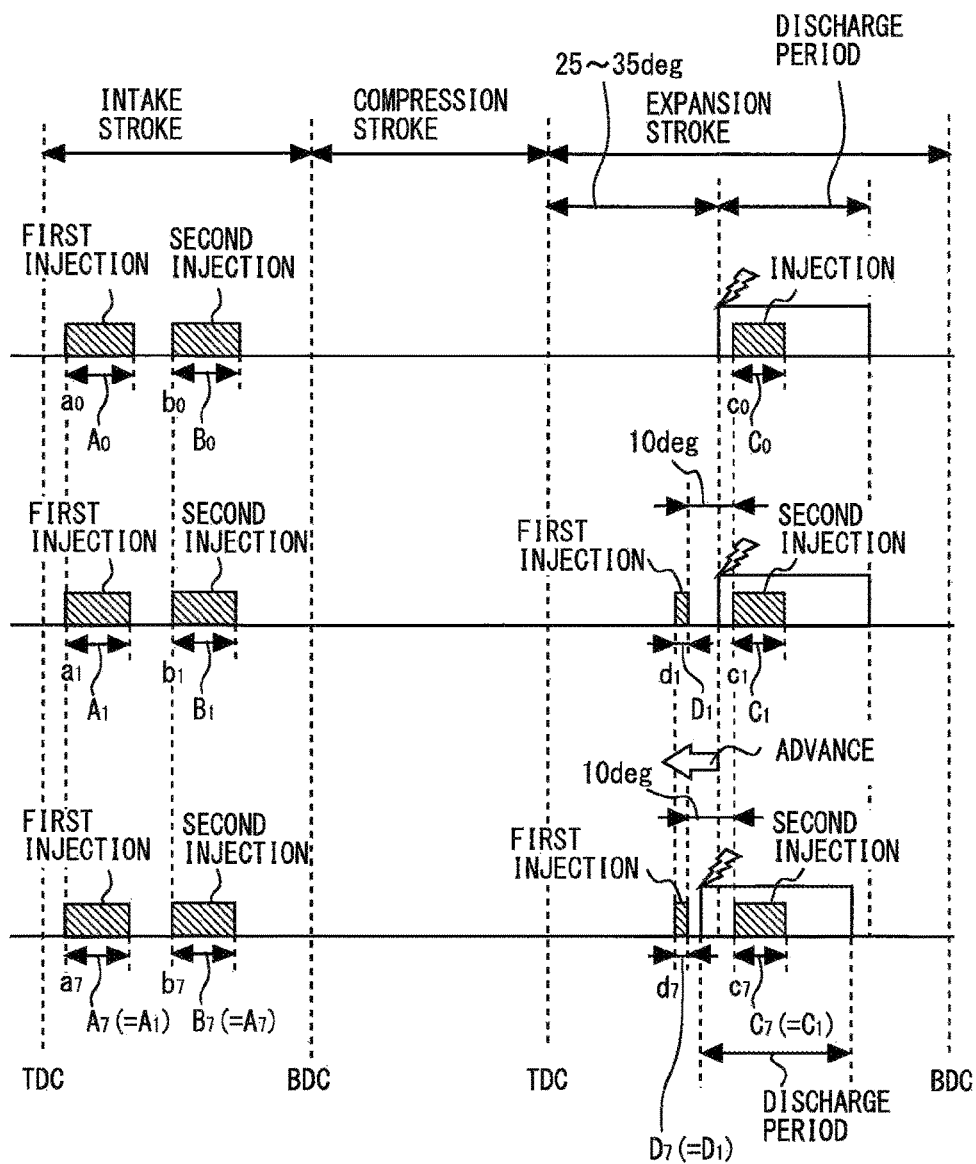
FIG. 29 is a view for describing an overview of catalyst warm-up control according to a seventh embodiment of the present disclosure.

FIG. 29 is a view for describing an overview of the catalyst warm-up control of the seventh embodiment of the present disclosure. Similarly to FIG. 7, injection start timings, injection periods and discharge periods at the electrode portion 34 during catalyst warm-up control are illustrated in FIG. 29. In the upper section and middle section in FIG. 29, control is illustrated that is the same as the control illustrated in the upper section and middle section in FIG. 7. Therefore, a description of these controls is omitted here.

In the lower section in FIG. 29, control for a case where it is determined that the distance DT decreases too much is illustrated. In this case, the expansion stroke first injection is started at a crank angle $d_7$, and is performed over an injection period $D_7$. Further, the expansion stroke second injection is started at a crank angle $c_7$, and is performed over an injection period $C_7$. The crank angles $c_7$ and $d_7$ match the crank angles $c_1$ and $d_1$. Further, the injection periods $C_7$ and $D_7$ are set to periods that are equal to the injection periods $C_1$ and $D_1$. In addition, a discharge period shown in the lower section in FIG. 29 is set to a period that is equal to the respective discharge periods shown in the upper section and middle section in FIG. 29. However, the start timing of the discharge illustrated in the lower section in FIG. 29 is set further on the advance side relative to the start timing of the discharges illustrated in the upper section and middle section in FIG. 29.

Further, in the lower section in FIG. 29, a first intake stroke injection is started at a crank angle $a_7$ and a second intake stroke injection is started at a crank angle $b_7$. In this case, the crank angles $a_7$ and $b_7$ match the crank angles $a_1$ and $b_1$. Further, a first injection period $A_7$ and a second injection period $B_7$ of the intake stroke injections are set to equal periods. Furthermore, the injection periods $A_7$ and $B_7$ are set to a period that is equal to the injection period $A_1$ ($=B_1$).

When the start timing of the discharge is advanced, although an initial flame that arises from a discharge spark and an air-fuel mixture including a fuel spray produced by the intake stroke injection engulfs a fuel spray produced by the first of the expansion stroke injections and grows at an early stage, it takes time until the initial flame further engulfs a fuel spray produced by the expansion stroke second injection, and as a result the rate of initial combustion becomes slow. Hence, the rate of initial combustion can be confined within a moderate range and a transition from the initial combustion to the main combustion can be stabilized.

Specific Processing in Seventh Embodiment

Figure 30:
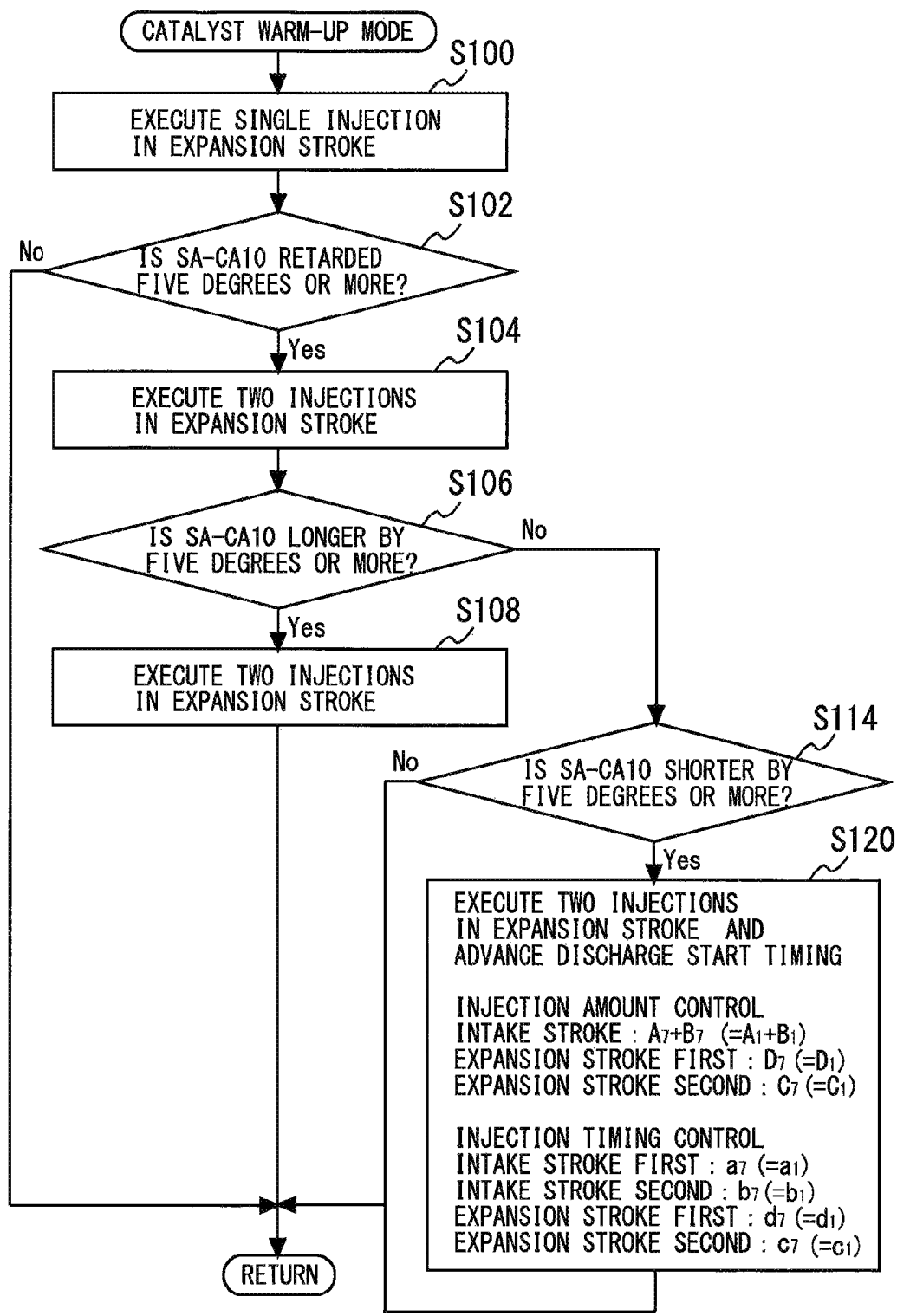
FIG. 30 is a flowchart illustrating an example of processing that the ECU 40 executes in the seventh embodiment of the present disclosure.

FIG. 30 is a flowchart illustrating one example of processing that the ECU 40 executes in the seventh embodiment of the present disclosure. Note that, the routine shown in FIG. 30 is repeatedly executed during a period in which the catalyst warm-up mode is selected.

In the routine illustrated in FIG. 30, the processing from steps S100 to S108 and S114 is executed. The processing in these steps is the same as the processing that is already described with reference to FIG. 26. However, in the present routine, in step S114, if it is determined that the actual SA-CA10 is shorter than the SA-CA10 at a normal time by the predetermined crank angle period or more (when the result is "Yes"), the processing proceeds to step S120.

In step S120, fuel injection control and discharge control for advancing the start timing of the discharge are executed. In the present step S120, specifically, the injection amounts (injection periods $A_7$ and $B_7$) and the injection timings (crank angles $a_7$ and $b_7$) for the intake stroke injections are set. Further, the injection amount (injection period $D_7$) and the injection timing (crank angle $d_7$) for the expansion stroke first injection are set. In addition, the injection amount (injection period $C_7$) for the expansion stroke second injection is set. Furthermore, the start timing of the discharge is set on the advance side.

According to the seventh embodiment that is described above, the following advantageous effect can be obtained. That is, if it is determined that the distance DT decreases too much, the rate of initial combustion can be confined within a moderate range and a transition from the initial combustion to the main combustion can be stabilized by advancing the start timing of the discharge.

Eighth Embodiment

Next, an eighth embodiment of the present disclosure will be described referring to FIG. 31 to FIG. 32.

Note that the present embodiment is based on the premise of adopting the system configuration illustrated in FIG. 1, and hence a description of the system configuration is omitted here.

Characteristics of Catalyst Warm-Up Control in Eighth Embodiment

In the above sixth embodiment, if it is determined that the distance DT decreases too much, the start timing of the expansion stroke second injection is retarded. In the present embodiment, in addition to retarding the start timing of the expansion stroke second injection, the start timing of the discharge is also retarded.

Figure 31:
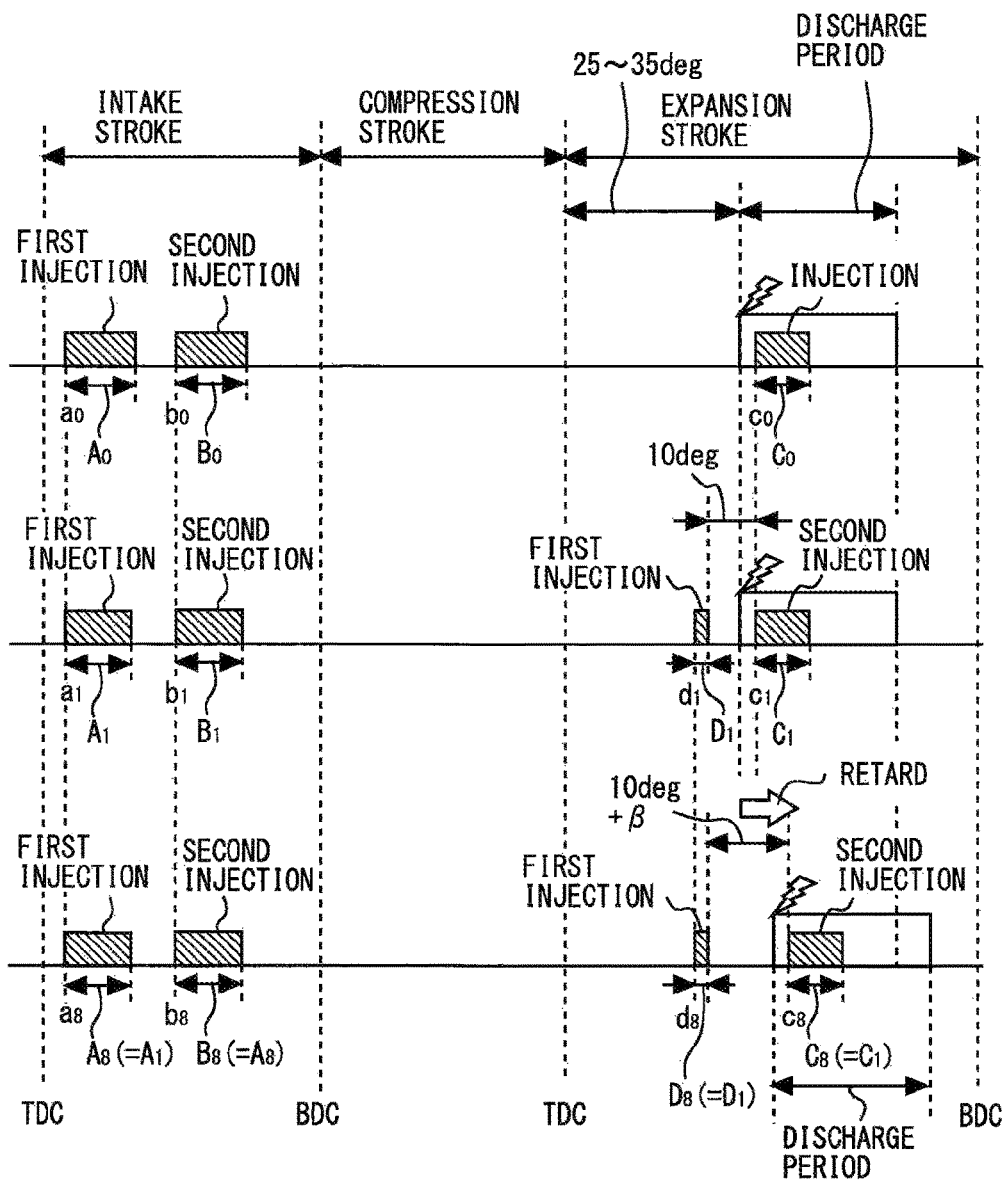
FIG. 31 is a view for describing an overview of catalyst warm-up control according to an eighth embodiment of the present disclosure.

FIG. 31 is a view for describing an overview of the catalyst warm-up control of the eighth embodiment of the present disclosure. Similarly to FIG. 7, injection start timings, injection periods and discharge periods at the electrode portion 34 during catalyst warm-up control are illustrated in FIG. 31. In the upper section and middle section in FIG. 31, control is illustrated that is the same as the control illustrated in the upper section and middle section in FIG. 7. Further, the discharge control (start timing and period of discharge) illustrated in FIG. 31 is also the same as the discharge control described with reference to FIG. 7. Therefore, a description of these controls is omitted here.

In the lower section in FIG. 31, control for a case where it is determined that the distance DT decreases too much is illustrated. In this case, the expansion stroke first injection is started at a crank angle $d_8$, and is performed over an injection period $D_8$. The crank angle $d_8$ matches the crank angle $d_1$, and the injection period $D_8$ is set to a period that is equal to the injection period $D_1$. Further, the expansion stroke second injection is started at a crank angle $c_8$, and is performed over an injection period $C_8$. Although the injection period $C_8$ is set to a period that is equal to the injection period $C_1$, the crank angle $c_8$ is set further on the retard side relative to the crank angle $c_1$. Consequently, an interval between the crank angle $c_8$ and the completion timing of the injection period $D_8$ expands ($10°+\alpha$) to an interval that is greater than a period required to charge the injector 30 (as one example, 10°). Further, the start timing of the discharge illustrated in the lower section in FIG. 31 is set further on the retard side relative to the start timing of the discharges illustrated in the upper section and middle section in FIG. 31.

Further, in the lower section in FIG. 31, a first intake stroke injection is started at a crank angle as and a second intake stroke injection is started at a crank angle $b_8$. In this case, the crank angles $a_8$ and $b_8$ match the crank angles $a_1$ and $b_1$. Further, a first injection period $A_8$ and a second injection period $B_8$ of the intake stroke injections are set to equal periods. Furthermore, the injection periods $A_8$ and $B_8$ are set to a period that is equal to the injection period $A_1$ ($=B_1$).

In-cylinder states when start timings of two injections and the start timing of a discharge in the expansion stroke are retarded can be described by replacing "before advancement" in the upper diagram in FIG. 23 with "after retardation", and replacing "after advancement" in the lower diagram in FIG. 23 with "before retardation". That is, when the start timings of two injections and the start timing of a discharge in the expansion stroke are retarded (upper diagram in FIG. 23), the fuel spray (ii) extends in the injection direction thereof and becomes narrow in comparison to a case where the aforementioned start timings are not retarded (lower diagram in FIG. 23). The reason is that, when the start timings of the two injections and the start timing of the discharge are retarded, the in-cylinder pressure becomes low in comparison to a case where the aforementioned start timings are not retarded, and it becomes easy for the fuel spray (ii) to disperse in the injection direction. If the fuel spray (ii) becomes narrow, a distance between the fuel spray (ii) and the spark plug 32 (the electrode portion 34) increases. Consequently, it takes time until an initial flame that grows by engulfing the fuel spray (i) further engulfs the fuel spray (ii), and as a result the rate of initial combustion becomes slow. Hence, the rate of initial combustion can be confined within a moderate range and a transition from the initial combustion to the main combustion can be stabilized.

Specific Processing in Eighth Embodiment

Figure 32:
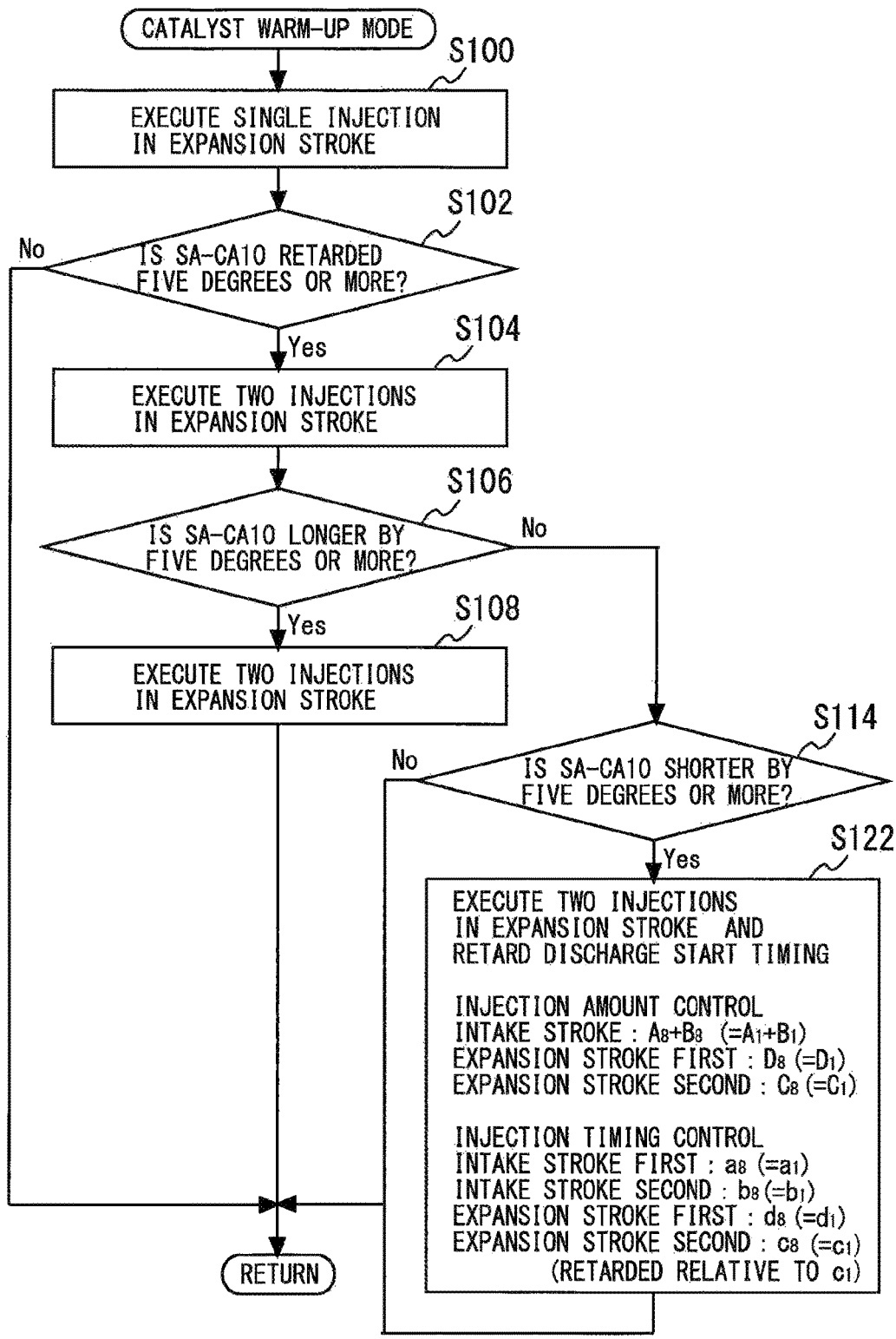
FIG. 32 is a flowchart illustrating an example of processing that the ECU 40 executes in the eighth embodiment of the present disclosure.

FIG. 32 is a flowchart illustrating one example of processing that the ECU 40 executes in the eighth embodiment of the present disclosure. Note that, the routine shown in FIG. 32 is repeatedly executed during a period in which the catalyst warm-up mode is selected.

In the routine illustrated in FIG. 32, the processing from steps S100 to S108 and S114 is executed. The processing in these steps is the same as the processing that is already described with reference to FIG. 26. However, in the present routine, in step S114, if it is determined that the actual SA-CA10 is shorter than the SA-CA10 at a normal time by the predetermined crank angle period or more (when the result is "Yes"), the processing proceeds to step S122.

In step S122, fuel injection control for retarding the start timing of the expansion stroke second injection is executed, and discharge control for retarding the start timing of the discharge is executed. In the present step S122, specifically, the injection amounts (injection periods $A_8$ and $B_8$) and the injection timings (crank angles $a_8$ and $b_8$) for the intake stroke injections are set. Further, the injection amount (injection period $D_8$) and the injection timing (crank angle $d_8$) for the expansion stroke first injection are set. In addition, the injection amount (injection period $C_8$) for the expansion stroke second injection is set. Further, the injection timing (crank angle $c_8$) is set on the retard side. Furthermore, the start timing for the discharge is set on the retard side.

According to the eighth embodiment that is described above, the following advantageous effect can be obtained. That is, if it is determined that the distance DT decreases too much, the rate of initial combustion can be confined within a moderate range and a transition from the initial combustion to the main combustion can be stabilized by retarding the start timing of the expansion stroke second injection and the start timing of the discharge.

What is claimed is:

1. A control device for controlling an internal combustion engine, the internal combustion engine comprising:
   an injector which is provided in an upper portion of a combustion chamber and is configured to inject fuel directly into a cylinder;
   a spark plug which is configured to ignite an air-fuel mixture inside a cylinder using a discharge spark that is generated at an electrode portion, and which is provided at a position that is at the upper portion of the combustion chamber and is on a downstream side relative to the injector in a flow direction of a tumble flow that is formed inside the combustion chamber, and is provided so that a position of the electrode portion is above a contour surface of a fuel spray that is injected toward the spark plug from the injector; and
   an exhaust gas purification catalyst which is configured to purify exhaust gas from the combustion chamber;
   the control device which is configured to control at least fuel injection by the injector and a discharge at the electrode portion by the spark plug,
   wherein the control device is further configured to:
   control the injector so as to perform an intake stroke injection and an expansion stroke injection that activate the exhaust gas purification catalyst and also control the spark plug so as to generate a discharge spark at the electrode portion over a predetermined period, the predetermined period is on a retard side of compression top dead center and includes a period in which the expansion stroke injection is performed; and
   control the injector so as to perform, in addition to the intake stroke injection and the expansion stroke injection, an additional injection at a timing that is on a retard side relative to compression top dead center and is on an advance side relative to an occurrence timing of the discharge spark at the electrode portion when it is determined that a growth rate of an initial flame which arises from a discharge spark and which is caused to grow while engulfing a fuel spray produced by the expansion stroke injection in the predetermined period is less than a first determination value.

2. The control device for an internal combustion engine according to claim 1, wherein the control device is further configured to control the injector so that an injection amount of the additional injection is less than an injection amount of the expansion stroke injection.

3. The control device for an internal combustion engine according to claim 1, wherein the control device is further configured to, when it is determined that the growth rate is less than the first determination value, control the injector so as to progressively increase an injection amount of the additional injection as a difference between the growth rate and the first determination value increases.

4. The control device for an internal combustion engine according to claim 1, wherein the control device is further configured to, when it is determined that the growth rate is still lower than the first determination value even though the injector is controlled so as to perform the additional injection, control the injector so as to increase an injection amount of the expansion stroke injection, or control the injector so as to advance an injection timing of the expansion stroke injection and also control the spark plug so as to advance the occurrence timing.

5. The control device for an internal combustion engine according to claim 1, wherein the control device is further configured to, when it is determined that, as a result of controlling the injector so as to perform the additional injection, the growth rate exceeds a second determination value that is greater than the first determination value, control the injector so as to decrease an injection amount of the expansion stroke injection or control the injector so as to retard an injection timing of the expansion stroke injection, control the spark plug so as to advance a start timing of the predetermined period, or control the injector so as to retard an injection timing of the expansion stroke injection and also control the spark plug so as to retard the occurrence timing.

6. The control device for an internal combustion engine according to claim 1, wherein the control device is further configured to perform a determination with respect to the growth rate based on a crank angle period until a mass fraction burned becomes 10% from 0% after occurrence of a discharge spark at the electrode portion.

* * * * *